United States Patent
Gärdenfors et al.

(10) Patent No.: US 9,686,346 B2
(45) Date of Patent: Jun. 20, 2017

(54) DEVICE AND METHOD FOR GENERATING DATA FOR GENERATING OR MODIFYING A DISPLAY OBJECT

(71) Applicant: BlackBerry Limited, Waterloo (CA)

(72) Inventors: Dan Zacharias Gärdenfors, Malmo (SE); Christopher Engström, Lund (SE)

(73) Assignee: BlackBerry Limited, Waterloo, Ontario (CA)

( * ) Notice: Subject to any disclaimer, the term of this patent is extended or adjusted under 35 U.S.C. 154(b) by 156 days.

(21) Appl. No.: 14/164,978

(22) Filed: Jan. 27, 2014

(65) Prior Publication Data
US 2014/0324938 A1    Oct. 30, 2014

Related U.S. Application Data

(63) Continuation-in-part of application No. 13/869,742, filed on Apr. 24, 2013.

(51) Int. Cl.
G09G 5/00 (2006.01)
H04L 29/08 (2006.01)
H04M 1/725 (2006.01)

(52) U.S. Cl.
CPC ........ H04L 67/10 (2013.01); H04M 1/72533 (2013.01); H04M 2250/16 (2013.01)

(58) Field of Classification Search
None
See application file for complete search history.

(56) References Cited

U.S. PATENT DOCUMENTS

| | | | |
|---|---|---|---|
| 8,332,771 B2* | 12/2012 | Inaba | 715/769 |
| 8,924,858 B2* | 12/2014 | Mistry et al. | 715/748 |
| 9,041,735 B2* | 5/2015 | Choi et al. | 345/629 |
| 9,329,305 B2* | 5/2016 | Sieracki | G01V 11/002 |
| 2004/0032394 A1* | 2/2004 | Ayatsuka et al. | 345/156 |
| 2009/0132923 A1* | 5/2009 | Han et al. | 715/717 |
| 2010/0317332 A1* | 12/2010 | Bathiche et al. | 455/418 |
| 2011/0163944 A1 | 7/2011 | Bilbrey et al. | |
| 2011/0298700 A1 | 12/2011 | Ito et al. | |
| 2012/0188147 A1 | 7/2012 | Hosein et al. | |
| 2012/0246374 A1 | 9/2012 | Fino | |
| 2012/0290682 A1 | 11/2012 | Ohki | |
| 2013/0290882 A1 | 10/2013 | Cotte | |
| 2013/0315108 A1* | 11/2013 | Lindner | H04W 4/08 370/277 |

FOREIGN PATENT DOCUMENTS

| | | |
|---|---|---|
| DE | 102010052244 A1 | 5/2012 |
| EP | 2658228 A1 | 10/2013 |

OTHER PUBLICATIONS

Extended European Search Report from related European Patent Application No. 14165877.3 dated Sep. 4, 2014; 8 pages.
Extended European Search Report from related European Patent Application No. 13165253.9 dated Sep. 19, 2013; 6 pages.

* cited by examiner

*Primary Examiner* — M Good Johnson
(74) *Attorney, Agent, or Firm* — Thomas Grzesik; Fleit Gibbons Gutman Bongini & Bianco P.L.

(57) ABSTRACT

A method is described. The method comprising the steps of detecting an electronic device being positioned at one of a plurality of discrete positions, and generating data pertaining to at least one application associated with the one detected discrete position for generating or modifying a display object on a display generated by a remote device. A device is also described.

18 Claims, 14 Drawing Sheets

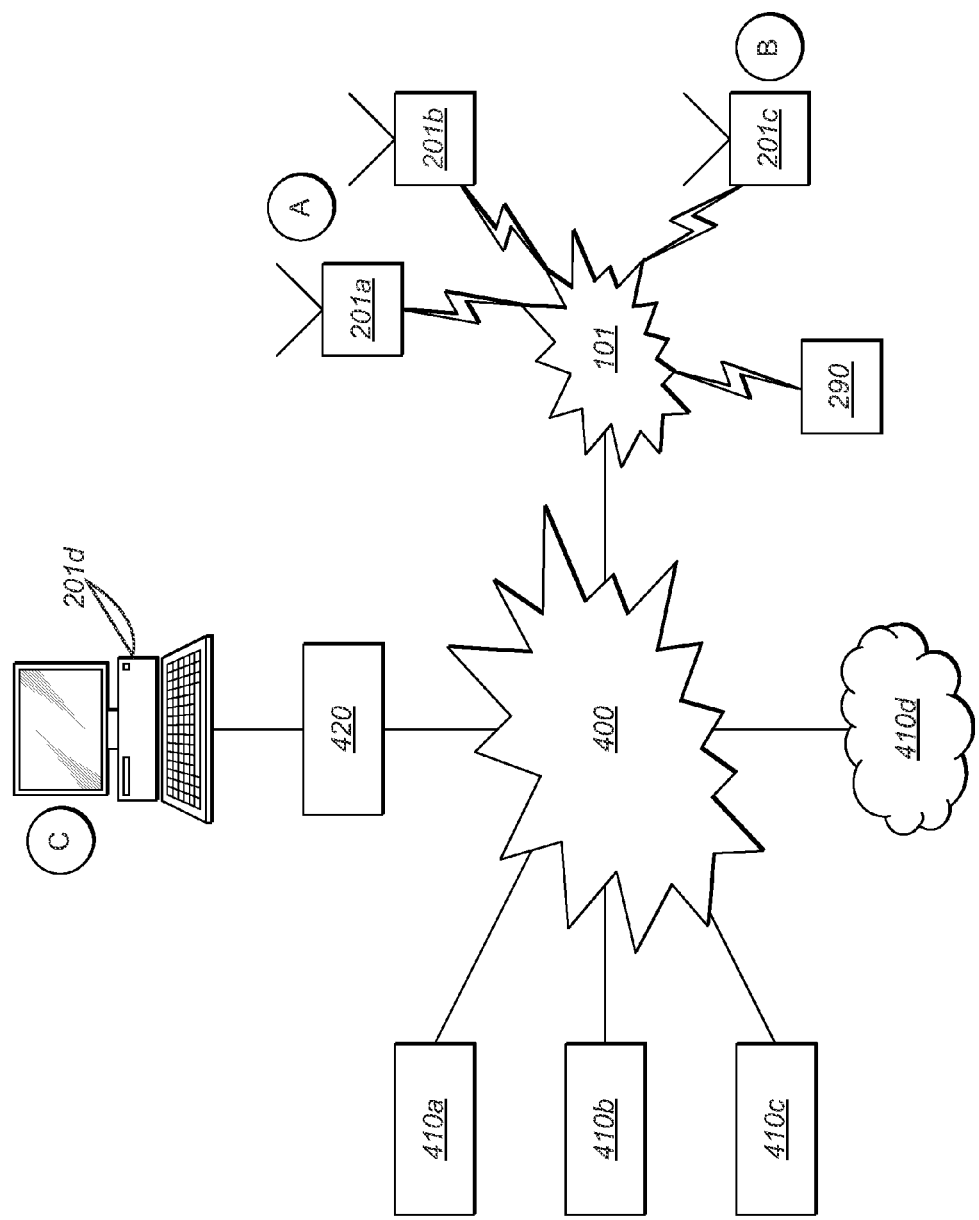

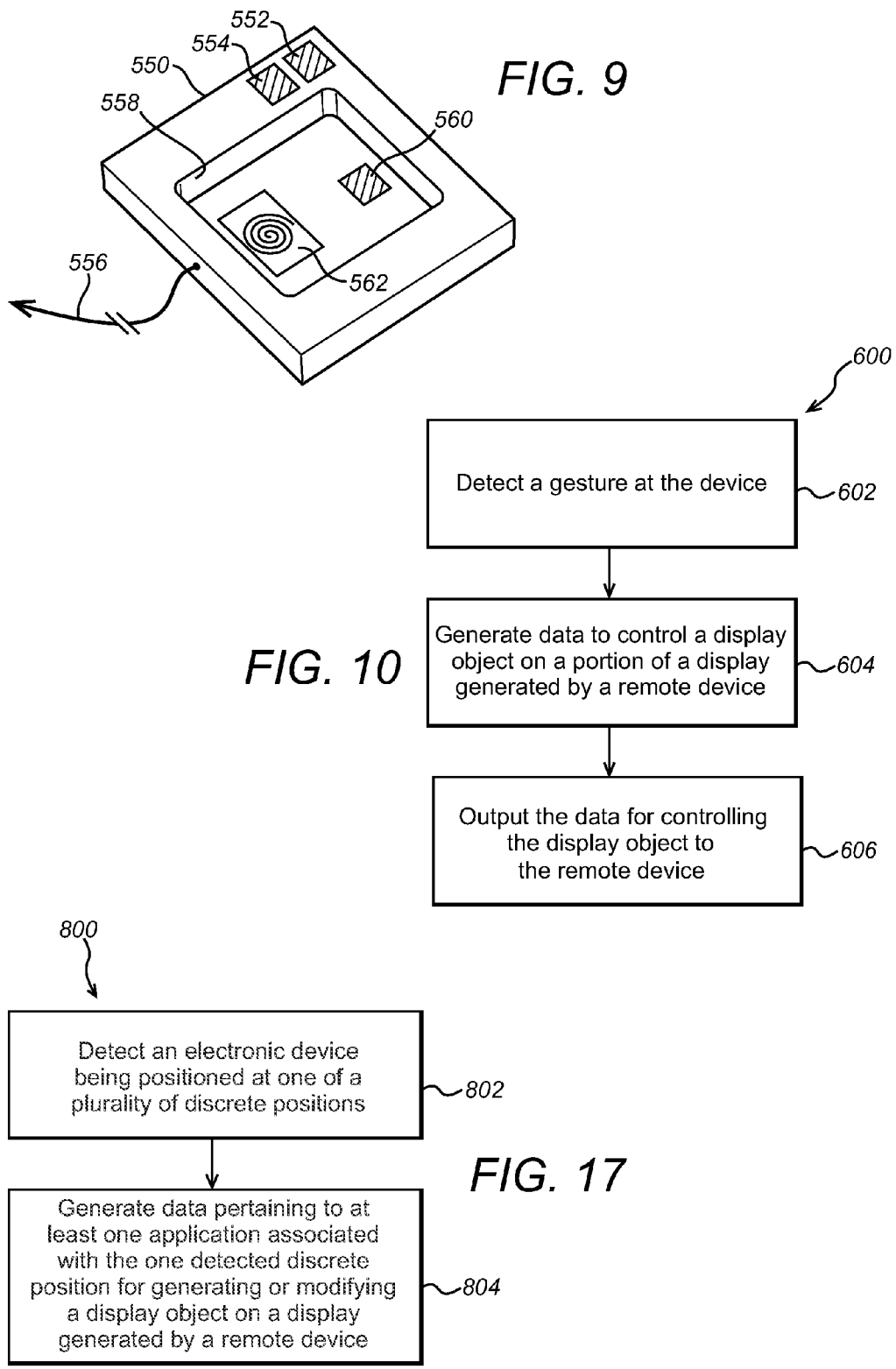

DEVICE AND METHOD FOR GENERATING DATA FOR GENERATING OR MODIFYING A DISPLAY OBJECT

CROSS-REFERENCE TO RELATED APPLICATIONS

The present application is a continuation-in-part of U.S. patent application Ser. No. 13/869,742 filed Apr. 24, 2013, the contents of which are incorporated herein by reference.

TECHNICAL FIELD

The present disclosure relates to a method and device for generating or modifying display objects.

BACKGROUND

A user may often be working at a workstation or portable computer device, but still be checking received messages, on a second separate device. Examples are known that allow a user to view messages received by one device on another device when the two devices are in communication with each other. However, it may be confusing for the user to determine the source of the messages and how to perform any subsequent actions based on the messages.

BRIEF DESCRIPTION OF THE DRAWINGS

The present disclosure can be understood with reference to the description of the embodiments set out below, in conjunction with the appended drawings in which:

FIG. 4 is a schematic diagram of a system in which the aforementioned electronic devices can be employed in some embodiments;

FIG. 9 illustrates schematically a device in accordance with a fifth embodiment;

FIG. 10 is a flow diagram showing a method for receiving display object data;

FIG. 17 is a flow diagram showing a method for generating data.

DESCRIPTION

Figure 1:
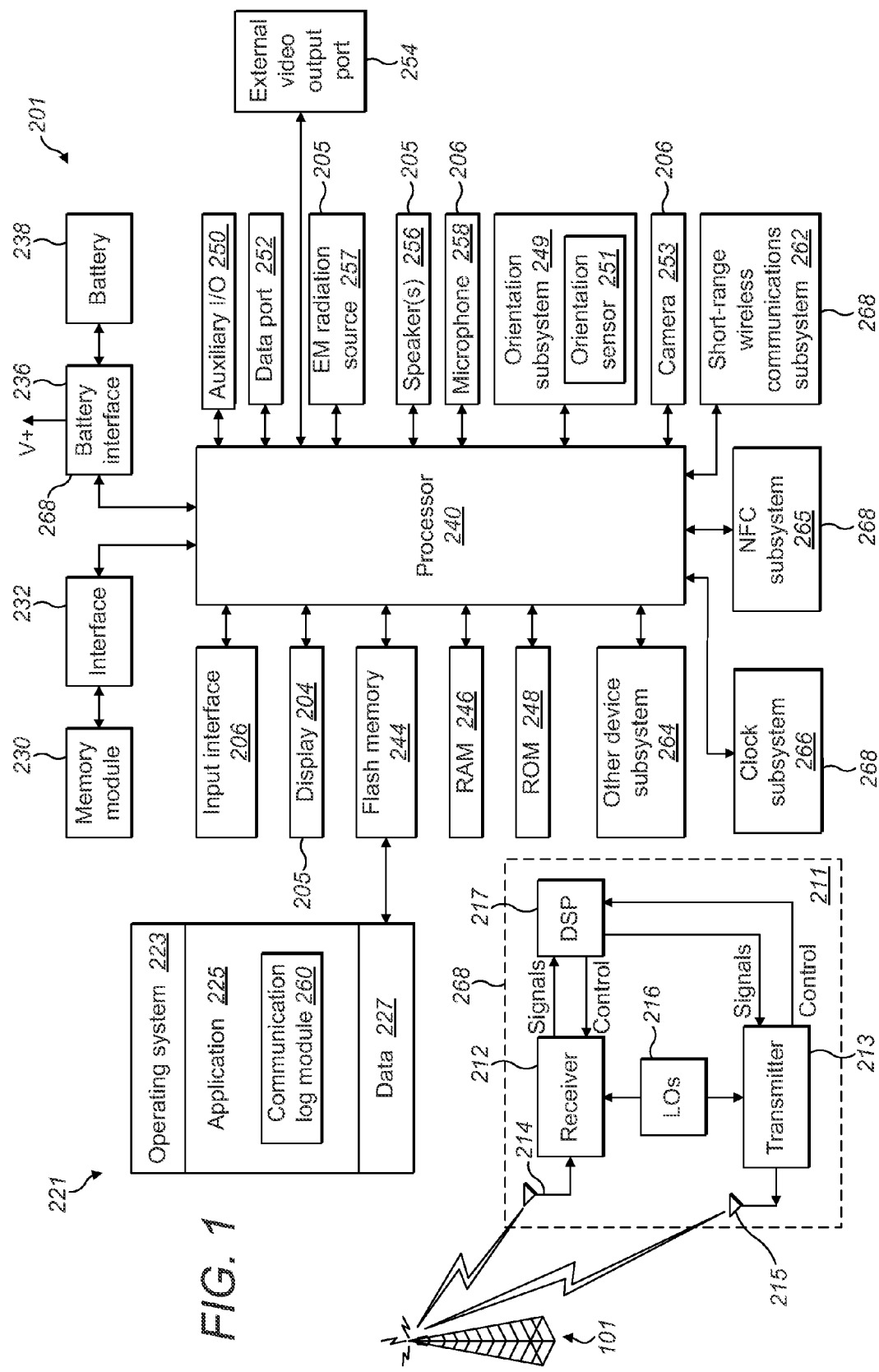
FIG. 1 is a schematic diagram illustrating components of an electronic device usable by a user in some embodiments.

This disclosure below is a description of one or more exemplary embodiments which are not intended to be limiting on the scope of the appended claims.

In a first aspect there is provided a method comprising the steps of: detecting an electronic device being positioned at one of a plurality of discrete positions; and generating data pertaining to at least one application associated with the one detected discrete position for generating or modifying a display object on a display generated by a remote device.

The discrete positions may be separated along a linear path of movement of the electronic device, or the discrete positions are separated radially along a rotational path of movement of the electronic device.

The method may comprise the steps of detecting the proximity of the electronic device to a surface and only registering movement that is performed while the electronic device is at the surface or only registering movement that is performed when the electronic device is not at the surface.

The method may comprise the step of only registering the movement if the electronic device is at the surface before and after the movement is performed.

The method may comprise the step of only registering the detected position of the electronic device when the electronic device is at the one of the plurality of discrete positions.

Each of the discrete positions may be associated with at least one of a plurality of applications executable on the electronic device.

At least one of the discrete positions is associated with executing at least one of the plurality of applications executable on the electronic device, wherein the method may comprise, in response to detecting the electronic device at the one discrete position, executing the at least one application and outputting, to the remote device, data pertaining to the executed application for generating a display object.

Each of the discrete positions is associated with at least one of a plurality of applications currently active on the electronic device, wherein the method may comprise: outputting, to the remote device, data pertaining to the executed application for generating a display object; and outputting data, in response to detecting the electronic device at the one discrete position, to update the display object associated with the executed application.

At least one of the discrete positions may be associated with outputting data to the remote device for generating a null display object or removing a displayed display object.

In a second aspect there is provided a method comprising the steps of: receiving, at a remote device, data pertaining to a detected position of an electronic device generated according to one or more of the above methods; and generating or modifying, at the remote device, a display object based on the received data.

In a third aspect there is provided a method comprising the steps of: receiving, at a remote device, position data of an electronic device, and performing one or more of the above methods.

Each of the discrete positions may be associated with at least one of a plurality of applications executable on the remote device.

At least one of the discrete positions may be associated with executing at least one of the plurality of applications executable on the electronic device, wherein the method may comprise, in response to detecting the electronic device at the one discrete position, executing the at least one application and outputting data pertaining to the executed application for generating a display object on the remote device.

Each of the discrete positions may be associated with at least one of a plurality of applications currently active on the remote device, wherein the method may comprise: outputting data pertaining to the executed application for generating a display object; and outputting data, in response to detecting the electronic device at the one discrete position, to update the display object associated with the executed application.

In a fourth aspect there is provided an electronic device, comprising processing circuitry configured to perform a method comprising the steps of: detecting an electronic device being positioned at one of a plurality of discrete positions; and generating data pertaining to at least one application associated with the one detected discrete position for generating or modifying a display object on a display generated by a remote device.

In a fifth aspect there is provided a computer-readable medium comprising executable instructions which, when executed, cause a processor to perform a method comprising the steps of: detecting an electronic device being positioned at one of a plurality of discrete positions; and generating data pertaining to at least one application associated with the one detected discrete position for generating or modifying a display object on a display generated by a remote device. The executable instructions may be computer-executable instructions. A device may be configured to receive the executable instructions from the computer-readable medium, and/or comprise the executable instructions, and be configured to execute the executable instructions.

The discrete positions may be separated along a linear path of movement of the electronic device or the discrete positions are separated radially along a rotational path of movement of the electronic device.

In the computer-readable medium, the method may comprise the steps of detecting the proximity of the electronic device to a surface and only registering movement that is performed while the electronic device is at the surface or only registering movement that is performed when the electronic device is not at the surface.

Each of the discrete positions may be is associated with at least one of a plurality of applications executable on the electronic device.

In the computer-readable medium, at least one of the discrete positions may be associated with executing at least one of the plurality of applications executable on the electronic device, wherein the method may comprise, in response to detecting the electronic device at the one discrete position, executing the at least one application and outputting, to the remote device, data pertaining to the executed application for generating a display object.

Reference is made to FIG. 1 which illustrates an electronic device 201 which is usable in accordance with the disclosure below. An electronic device 201 such as the electronic device 201 of FIG. 1 is configured to generate a user-controllable interface on a built-in display and/or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection.

It will be appreciated that, in certain embodiments, some of the features, systems or subsystems of the electronic device 201 discussed below with reference to FIG. 1 may be omitted from electronic devices 201 which are intended to perform solely operations in relation to the generation and output of display data and the modification of media content output.

In one embodiment, the electronic device 201 is a communication device and, more particularly, may be a mobile or handheld device, such as a mobile or handheld communication device, for example having data and voice communication capabilities. It may also have the capability to communicate with other computer systems; for example, via a data link or network, such as a short-range radio frequency link, e.g. Bluetooth, or via a data network, which may be wireless and may be connected to the Internet. It will be appreciated that the electronic device 201 may take other forms, including any one of the forms listed below. Depending on the functionality provided by the electronic device 201, in certain embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile, handheld or portable communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimetres. As such, the device 201 may be portable in a bag, or clothing pocket.

The electronic device 201 includes a controller including a processor 240 (such as a microprocessor) which controls the operation of the electronic device 201. In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one embodiment is the flash memory 244. In various embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one embodiment, the system clock comprises its own alternate power source. The system clock provides an indicator of a current time value, the system time, represented as a year/month/day/hour/minute/second/milliseconds value. In other embodiments, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The processor 240 is in communication with the memory and the touch-sensitive input interface 206 to detect user input via the input interface 206. The processor 240 then generates or updates display data comprising a display object for display by the display device 204 in accordance with the user input. The processor 240 then outputs the display data for display on the display device 204. In an embodiment, the user input may comprise a swipe gesture across the touchscreen interface 206.

A gesture can be described as any physical movement that a device or other sensor can sense and be responsive to. Input devices that detect motion and thus allow users to perform gestures include mice, digital gloves, optical, ultrasonic or RF sensors, cameras, touch screens, proximity sensors, accelerometers and gyroscopes. A gesture may be described as a sequence of single or multidimensional movements at a given point in time or over time, and at one point or location in space, or from one point or location in space to another, where the way a gesture is made or drawn in space or over time can change the meaning of a gesture, and define the gesture. The gesture may be defined by a change in physical configuration, posture or position of the device or sensor. A gesture may be described as a set of measured points in space and/or a corresponding set of time intervals between measurements. Furthermore, a gesture may be described as a zero-dimensional movement which generates a boolean output value of 1 or 0 which can be input into the device, for example where a predefined threshold is exceeded.

In at least some embodiments, the touch-sensitive overlay has a touch-sensitive input surface which is larger than the display 204. For example, in at least some embodiments, the touch-sensitive overlay may extend overtop of a frame (not shown) which surrounds the display 204. In such embodiments, the frame (not shown) may be referred to as an active frame since it is capable of acting as an input interface 206. In at least some embodiments, the touch-sensitive overlay may extend to the sides of the electronic device 201.

The input interface 206 may also comprise the touchscreen, in which case the electronic device 201 may be referred to as a 'multi-touch device'. The input detected by the touchscreen interface may comprise any suitable user touch-based input. For example, the input may comprise a gesture input such as a tap, a multi-tap, a long press, a swipe or scroll or slide, a pan, a flick, a multi-swipe, a multi-finger tap, a multi-finger scroll or swipe, a pinch, a two-hand pinch, a spread, a two-hand spread, a rotation, a two-hand rotation, a slide and rotation, a multi-direction slide, a multi-finger slide and rotation, a multi-finger slide, etc. It will be appreciated that the gesture input may comprise a sequence of input elements or stages performed within a specified or predetermined time frame, for example, a three-tap gesture in which each tap comprises an element (or a sub-input, a phase or a stage) of the input and the three taps are performed within a time frame that enables the processor 240 to detect the taps as elements of a single input. Additionally or alternatively, an input may comprise removing a point of contact, e.g., a finger or stylus, from the touchscreen interface.

Many examples described herein refer to a gesture detected by a touch-sensitive display, but other methods of gesture detection may be used. For example, a gesture may be a generalized trajectory description characterized as a sequence of 3D points in time, and as such many different sensors may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known.

An accelerometer or gyroscope may be utilized to detect 3D spatial gestures. A sequence of acceleration values may be detected in the different spatial dimensions as a function of time and constitute trajectory information that can be recognized as a gesture. For example, a quick flick and a tilt of the portable electronic device are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device.

A gesture input is different to input of a command by manipulation of a control component presented on the screen because a gesture input can be performed at any location at an electronic device (e.g., at the display screen or surround the display screen) in contrast to a single contact point for a user finger or input stylus on a corresponding control element. In order to input a command using a control component, the user must contact the screen at a specific location corresponding to that component. For example, in order to change an output volume using a volume control, the user must select the volume control by touching the location at which the volume control is displayed and moving the displayed control element by a desired amount through movement of the user's finger across the screen. Such user input must therefore be precisely controlled in order to use control elements to input commands. Gesture-based inputs, on the other hand, do not require the same precise control as they are not tied to a specific location on the screen. Instead, a user wishing to, e.g., scroll through a list of media content can do so by performing a swipe gesture at any location within a media-player display.

As noted above, in some embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some embodiments, the orientation subsystem 249 includes other orientation sensors 251, instead of or in addition to accelerometers. For example, in various embodiments, the orientation subsystem 249 may include a gravity sensor, a gyroscope, a tilt sensor, an electronic compass or other suitable sensor, or combinations thereof. In some embodiments, the device orientation subsystem 249 may include two or more orientation sensors 251 such as an accelerometer and an electronic compass.

The electronic device 201, in at least some embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some embodiments, an electronic device 201 includes a plurality of speakers 256. For example, in some embodiments, the electronic device 201 includes two or more speakers 256. The two or more speakers 256 may, for example, be disposed in spaced relation to one another. That is, in at least some embodiments, the electronic device 201 may include a first speaker and a second speaker and the first speaker and the second speaker may be spatially separated from one another within the electronic device 201. In at least some embodiments, the display 204 may be disposed between the first speaker and the second speaker of the electronic device. In such embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such embodiments, the direction of capture of the camera is always predictable relative to the display 204 or the housing. In at least some embodiments, the camera may be provided in a central location relative to the display 204 to facilitate image acquisition of a face.

In at least some embodiments, the electronic device 201 includes an electromagnetic (EM) radiation source 257. In at least some embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

In some embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of an incoming message being received by the electronic device 201. The incoming message may be an email, a message received via a social networking website, an SMS (short message service) message, or a telephone call, for example.

The electronic device 201 is, in some embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as a media player module 260. In the embodiment of FIG. 1, the media player module 260 is implemented as a stand-alone application 225. However, in other embodiments, the presentation module 260 could be implemented as part of the operating system 223 or other applications 225.

As discussed above, electronic devices 201 which are configured to perform operations in relation to a communications log may take a variety of forms. In at least some embodiments, one or more of the electronic devices which are configured to perform operations in relation to the presentation module 260 are a smart phone or a tablet computer.

Figure 2:
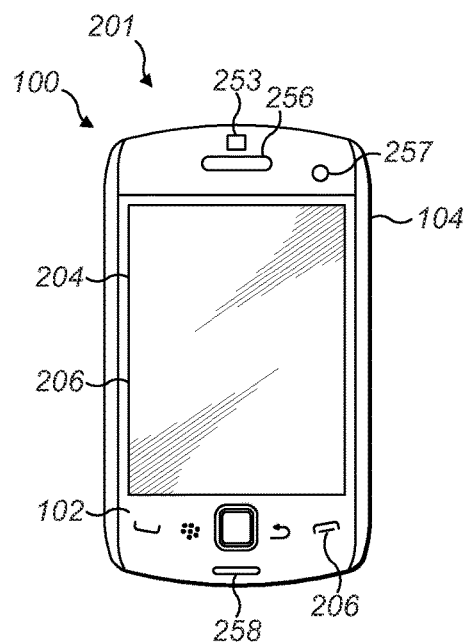
FIG. 2 is a plan view of the upper external side of one electronic device usable by an end-user in some embodiments.

Referring now to FIG. 2, a front view of an electronic device 201 which in one example may be a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 includes all of the components discussed above with reference to FIG. 1, or a subset of those components. The smartphone 100 includes a housing 104 which houses at least some of the components discussed above with reference to FIG. 1.

In the embodiment, the smartphone includes a display 204, which may be a touchscreen which acts as an input interface 206. The display 204 is disposed within the smartphone 100 so that it is viewable at a front side 102 of the smartphone 100. That is, a viewable side of the display 204 is disposed on the front side 102 of the smartphone. In the embodiment illustrated, the display 204 is framed by the housing 104.

The smartphone 100 also includes other input interfaces 206 such as one or more buttons, keys or navigational input mechanisms. In the embodiment illustrated, at least some of these additional input interfaces 206 are disposed for actuation at a front side 102 of the smartphone.

The smartphone may also include a speaker 256. In the embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the smartphone 100 of FIG. 2 includes a single speaker 256, in other embodiments, the smartphone 100 may include a greater number of speakers 256. For example, in at least some embodiments, the smartphone 100 may include a second speaker 256 which is disposed vertically below the display 204 when the smartphone is held in a portrait orientation where its height is longer than its width (i.e. the orientation illustrated in FIG. 2).

The smartphone 100 also includes a microphone 258. In the embodiment illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The smartphone 100 also includes a front facing camera 253 which may be located vertically above the display 204 when the smartphone 100 is held in a portrait orientation where its height is longer than its width. The front facing camera 253 is located so that it may capture images of objects which are located in front of or surrounding the front side of the smartphone 100.

The smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of or surrounding the front side of the smartphone 100. Such electromagnetic radiation (or the projection of electromagnetic radiation onto objects) may be captured on images detected by the camera 253.

Figure 3:
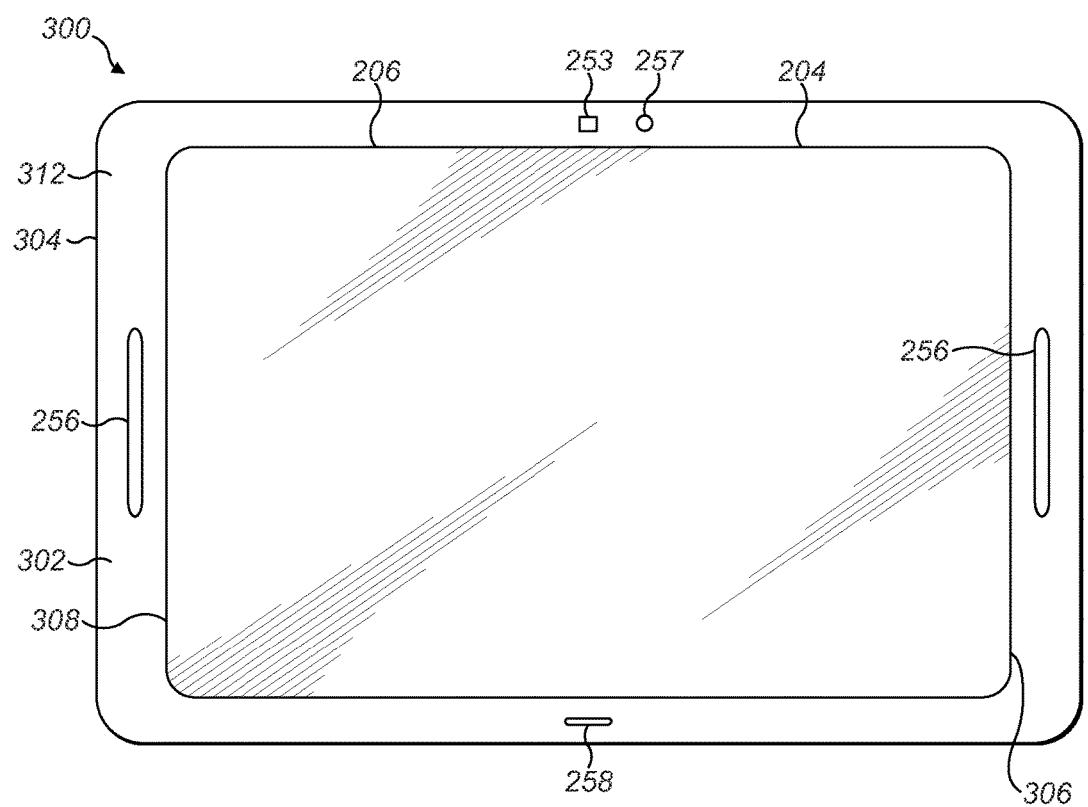
FIG. 3 is a plan view of the upper external side of one alternative electronic device usable by an end-user in some embodiments.

Referring now to FIG. 3, a front view of an example electronic device 201, which in one embodiment may be a tablet computer 300, is illustrated. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the embodiment illustrated, the display 204 is framed by the housing 304.

A frame 312 surrounds the display 204. The frame 312 is portion of the housing 304 which provides a border around the display 204. In at least some embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The tablet computer 300 includes a plurality of speakers 256. In the embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the tablet computer 300.

The tablet computer 300 also includes a microphone 258. In the embodiment illustrated, the microphone 258 is vertically disposed below the display 204 when the tablet computer is held in the landscape orientation illustrated in FIG. 3. The microphone 258 may be located in other locations in other embodiments.

The tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of or surrounding the front side 302 of the tablet computer 300. Such electromagnetic radiation (or the projection of electromagnetic radiation onto objects) may be captured on images detected by the camera 253.

The tablet computer 300 may have the ability to run third party applications which are stored on the tablet computer.

The electronic device 201, which may be tablet computer 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-user's text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a web-site using a browser on any internet-enabled electronic device.

FIG. 4 shows a system of networked apparatus by which electronic communications can be sent and received using multiple electronic devices 201*a*, 201*b*, 201*c*. Referring to FIG. 4, electronic devices 201*a*, 201*b* and 201*c* are connected to wireless network 101 to perform voice and data communications, and to transmit data to an external display device 290 residing on the wireless network. Wireless network 101 is also connected to the communications network 400, e.g. Internet. Electronic device 201*a* may be a tablet computer similar to tablet computer 300 described in FIG. 2 above. Electronic devices 201b and 201c may be smartphones. Electronic device 201d is a computing device such as a notebook, laptop or desktop, which is connected by a wired broadband connection to Local Area Network 420, and which is also connected to the communications network 400. Electronic devices 201a, b, c, d may access the communications network 400 to perform data communications therewith.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers.

Other servers and services may of course be provided allowing users of electronic devices 201a, 201b, 201c and 201d to send and receive electronic communications by, for example, Voice over IP phone calls, video IP calls, video chat, group video chat, blogs, file transfers, instant messaging, and feeds.

Wireless network 101 may also support electronic communications without using communications network 400. For example, a user of smart phone 201b may use wireless network 101 to make telephony calls, video calls, send text messages, send multimedia messages, and send instant messages to smart phone 201c, and to display application data on a display screen of the external display device 290, or control the display of application data.

The embodiment shown in FIG. 4 is intended to be non-limiting and additional network infrastructure may of course be provided, such as a Public Switched Telephone Network (not shown), which may be used, for example, to make telephony calls using smartphone 201b to a wired phone (not shown).

In order to explain certain example modes of operation, reference is made below to FIGS. 5A to 17.

Figure 5A:
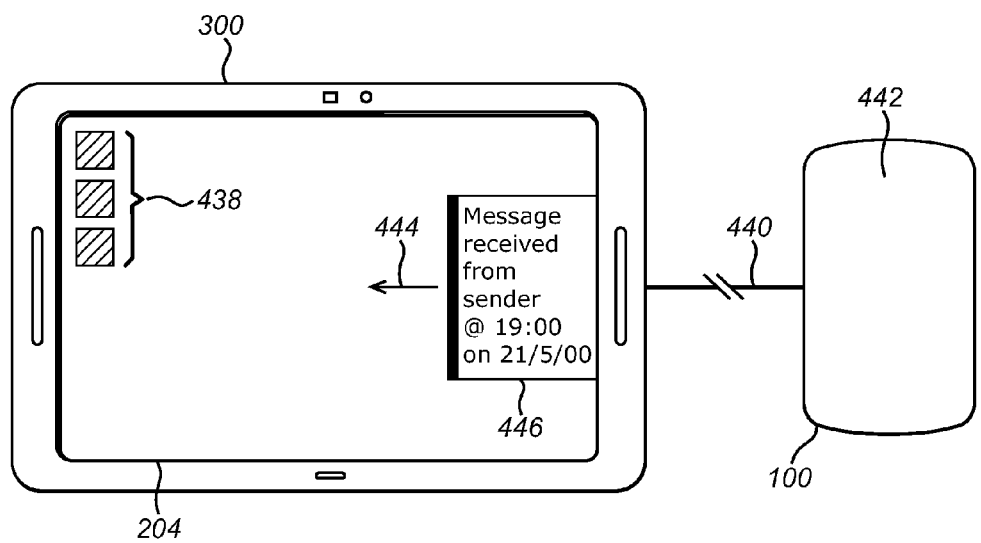
FIGS. 5A and 5B illustrate the two devices illustrated in FIGS. 2 and 3 in communication with one another showing how a display object may be handled according to a first embodiment.

FIG. 5A illustrates the device 100 and device 300 illustrated in FIGS. 2 and 3 respectively according to a first embodiment. The two devices 100, 300 are in communication, such that any establishment of a connection has already been performed. For example, the two devices may establish a wireless connection using Bluetooth® or wired using USB, as described above. The device on the left hand side of the figure is described as the second device 300 and the device on the right hand side is described as the first device 100. In the figure, the established communication channel is illustrated with a line 440, where the communication between the two device 100, 300 may be achieved using a wired or wireless protocol.

In this example, the first device 100 generally generates and outputs data to the second device 300 for display. The second device 300 may be described as a remote device to the extent that it is remote from the first device 100. The outputted data may include any data from an application currently running or active on the processor 240 of the first device 100, and may be, for example, data relating to received messages, diary alerts, reminders, received data, data feeds, or status updates. The transfer of data between the first device 100 and the second device 300 is performed in examples described herein using the Blackberry Bridge. However, other protocols that allow messages, feeds, notifications and similar to be pushed-to or transferred to the second device 100 from the second device 300, for example Link. Furthermore, in the examples described herein the first device 100 and the second device 300 have installed thereon an executable application to allow the first device 100 to push data to the second device 300.

FIG. 5A illustrates an example in which a data for generating a display object (which may be referred to as notification) is pushed to or transferred to the second device 300 by the processor 240 of the first device 100. In the embodiments described herein a display object is an object, for example, an icon or window that occupies a portion of a display of the remote device, but does not occupy the entire display area. The display 204 of the second device 300 includes one or more selectable display icons 438 that are associated with applications stored on the second device 438. One of the display icons 438 may be used to launch or execute the Bridge software or application used herein. In this example, a message application active on the processor 240 of the first device 100 receives a message. In the embodiments described herein, applications are described as being active (i.e., running on a processor 240), but it will be appreciated that an application may also be executable on a device, i.e., capable of being run or active, such that the application for generating the display object data may be active or running even when no other applications are currently active. Display object data is sent (i.e. transmitted) to the second device 300 by the processor 240 of the first device in response to receiving the message. In this example the display object data contains data from the received message to allow the processor 240 of the second device 300 to generate a display object. For example, the data may include plain text pertaining to the received message including the sender of the message, details on when the message was received, e.g., date and time, and data on the display object, e.g., possible position on the display. In another example, the processor 240 of the first device may generate display data which when rendered by the processor 240 of the second device 300 may produce a display object. The first device 100 in the example illustrated in the figure is faced down, with the display facing downward and on a surface. This is illustrated in the figure by showing the back 442 of the device facing upwards. With the first device 100 placed in the downward position shown, one or more input devices described above of the first device 100 are used to detect that the device is face-down. For example, the camera 253 is used to detect that the first device 100 is face-down. The camera 253 is located on the front of the first device 100 (i.e., front facing), so that when the first device 100 is placed face-down on a surface, the camera 253 will not receive any light such that the processor 240 of the first device will determine that the first device 100 has been placed face-down. This intended placement of the first device 100 is a gesture performed by a user to indicate that the device is not in use and any display objects should be minimal and non-obstructive of the display area, and optionally be displayed for a short period of time. Accordingly, when the processor 240 of the first device 100 detects that the user has placed the device 100 face-down, data pertaining to a display object for use by the processor 240 of the second device 300 is output by the processor 240 of the first device 100. The data pertains to a display object to be displayed on the display 204 of the second device 300 that contains a minimal amount of information. For example, the data output to the second device 300 comprises the name of the sender, and the date and time the message was received. No other data is output by the first device 100 relating to the received message in this example. Upon receipt of the display object data, the processor 240 of the second device 300 generate a user display or interface 446 as illustrated in the figure, which contains the data from the first device 100.

Furthermore, the display object illustrated in the figure extends or moves in from the left hand side of the display 204, as illustrated by the arrow 444.

Figure 5B:
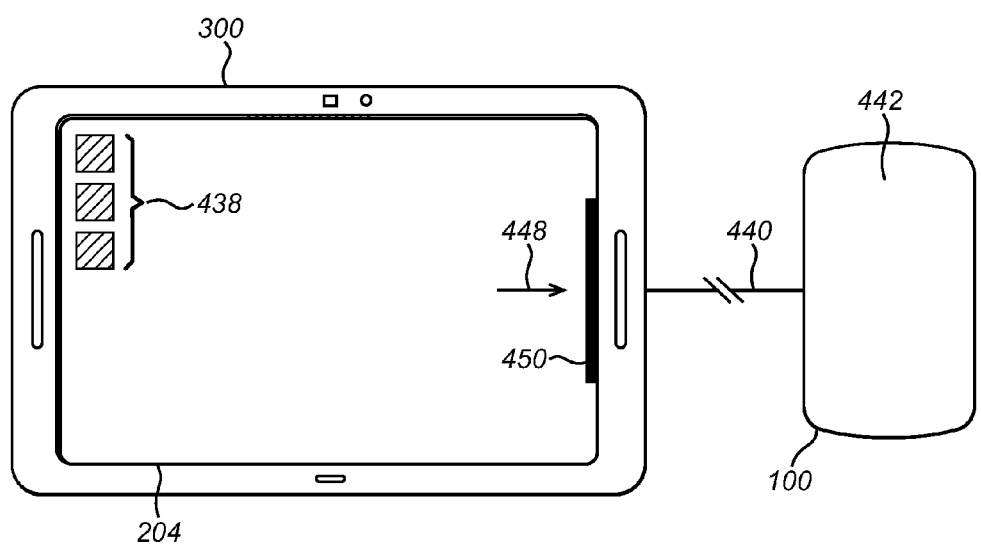

FIG. 5B illustrates that the display object displayed on the display 204 of the second device 300 disappears from view by moving back or reducing in size toward the right hand side of the display 204 as indicated by the arrow 448. Once the user display or user interface reduces so that the message display object is no longer displayed, a display icon 450 may remain at the right hand side of the display to illustrate to the user that display objects may be received from the first device 100. The reduction or removal of the display object 446 illustrated in FIG. 5A is in response to a predetermined time elapsing, for example, 5 s, 10 s, 15 s, 20 s, 25 or 30 s. Alternatively, further data may be received from the processor 240 of the first device 100 to instruct the processor 240 of the second device 300 to remove the display object from the display 204.

The above operation of providing a minimal display object containing, for example only a message sender and date and time of the message receipt, for only a short amount of time, e.g., 5 s, 10 s, 15 s, 20 s, 25 or 30 s is performed in response to detecting that the first device 100 is placed face-down. Accordingly, a user is able to indicate using a simple gesture of placing the device 100 face-down on a surface, that only minimal display objects should be displayed on the second device 300. It will be appreciated that the time the display object is displayed for may be increased or decreased beyond the range above, and more or less data may be included in the display object. For example, the display object may state that a message is received and provide no further information to a user.

Figure 6A:
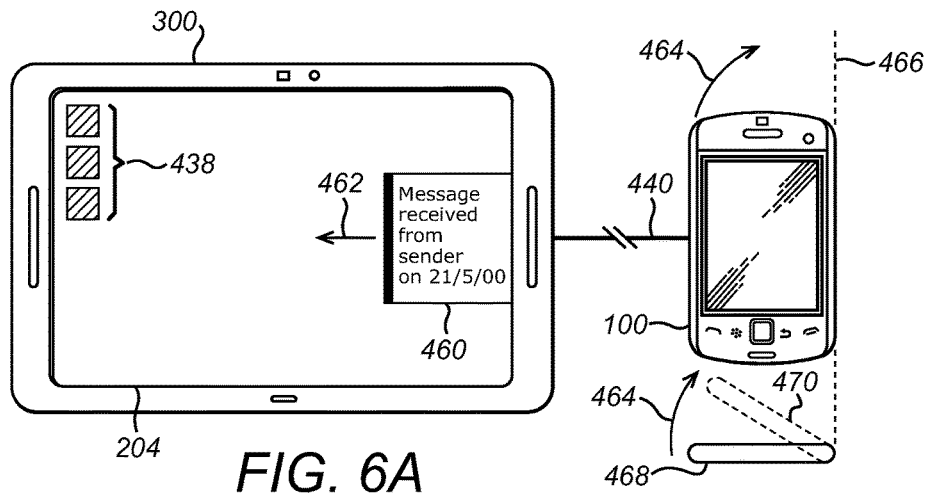
FIGS. 6A, 6B and 6C illustrate the two devices illustrated in FIGS. 2 and 3 in communication with one another showing how a display object may be handled in a second embodiment.

FIG. 6A illustrates the first device 100 and the second device 300 with an established connection 440 according to a second embodiment. In this example, the first device 100 is face-up, which may be detected by the camera 253, to indicate that the user would like to receive display objects and may act upon received display objects.

In the example illustrated in FIG. 6 a message application running on the processor 240 of the first device 100 receives a message and generates first data pertaining to a display object for use by the second device 300. The first data is output to the processor 240 of the second device 300 via the connection 440. The processor 240 of the second device 300 receives the data pertaining to the display object and generates a display object (or user interface) for display on the display 204 of the second device 300. The display object 460 is illustrated in the display 204 of the second device 300 and includes information on the message, which in this example is the message sender and the date on which the message is received. As illustrated in the figure, the message moves in or appears on the right hand side of the display 204, as indicated by arrow 462. In this example, the display object may be displayed for a longer period of time than described above in association with FIGS. 5A and 5B. For example, the display object 460 may be displayed for an integer number of minutes from 1 to 5 minutes, e.g., 1, 2, 3, 4 or 5 minutes, so as to be non-obtrusive. If no action is taken by the user the display object 460 will be removed or disappear from the display 204, typically moving back to the right hand side of the display 204. The time for displaying the display object may be communicated to the processor 240 of the second device 300, or the processor 240 of the first device 100 may output, to the processor 240 of the second device 300, further data to remove the display object. Alternatively, the processor 240 of the first device 100 may constantly update the visual or displayed state of the displayed display object until such a predetermined time has lapsed when the state is updated to clear the display object. The mode of operation described above with a display object appearing or moving in from the right hand side of the display 204 may be referred to as blending or a blend of the display object with the display objects of the second device 300. The term blend is used to describe a mode of operation where a display object based on data received from the first device 100 is combined with other display objects generated only by device 300 (i.e., without data received from the second device 100), but that control of the display object based on the data received from the first device 100 is provided by device 100.

In this embodiment, a user performs a gesture to indicate that they would like to view more information on the display object. It is assumed that the first device 100 is placed on a surface adjacent to the second device 300. The gesture used in this example is a tilt or rotation of the first device 100 along axis 466, which will be detected by a gyroscope or accelerometer coupled to the processor 240 of the first device 100 as discussed above. An end view 468 of the first device 100 is illustrated below the image of the first device 100 to show more clearly the gesture movement. The user tilts or rotates the first device 100 through an angle 464 to new position 470. In this example the tilt angle to view more of the message display object is an integer value between 1 and 45 degrees. However, it will be appreciated that other angles may be used. This may be described as a peek to indicate that the user wishes to view more information on the display object.

Figure 6B:
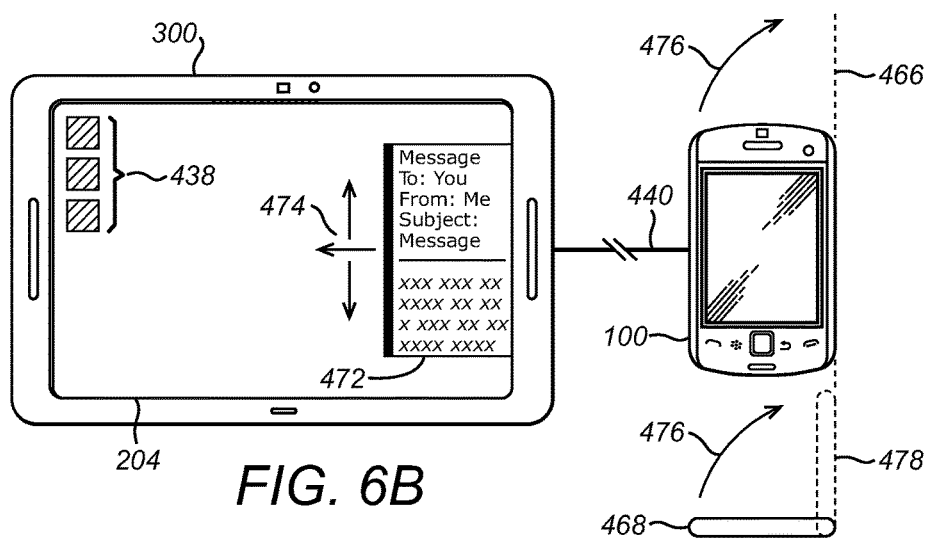

FIG. 6B illustrates that the display 204 of the second device 300 has changed in response to the detected tilt gesture. In this example, when the processor 240 of the first device 100 detects a tilt between 1 and 45 degrees, the processor 240 generated and outputs second data pertaining to the display object that contains more information on the received message than that contained in the previously output first data. In this example, the second data comprises the sender and receipt information, the subject line, and may contain the opening paragraph(s) of the message. It will be appreciated that the second display object data may contain at least the same information as in the first display object data previously output. In response to receiving the second display object data, the processor 240 of the second device 300 generates and outputs to the display 204 an updated and expanded view of the message display object, as illustrated by the arrows 474 in the figure. It will be appreciated that, although not shown, if the user performs a further gesture to rotate or tilt the first device 100 back to the surface, the processor 240 of the first device 100 may generate and output data to the second device 300 to reduce the display object to that illustrated in FIG. 6A or to remove the display object completely from display.

In the example illustrated in FIG. 6B the user may perform a further tilt gesture to perform a further action on the received display object. The user may optionally tilt or rotate the first device 100 further from the previous tilt angle, for example to tilt the first device 100 to an angle greater than 45 degrees. For example, if the user first tilts the first device 100 to 40 degrees the user is presented with an expended display object as illustrated in FIG. 6B and if the user tilts the first device 100 to an angle greater than 45 degrees, e.g. 90 degrees, a further action may be performed on the display object as described in association with FIG. 6C below. An end view 468 of the first device 100 is illustrated with the tilt angle 476 and the second tilt position 478. It will be appreciated that a user may tilt the first device 100 to an angle of greater than 45 degrees without stopping at an intermediate angle such that the expended view illustrated in FIG. 6B is not shown, rather the processor 240 of the first device 100 goes straight to the next step as discussed in association with FIG. 6C.

Figure 6C:
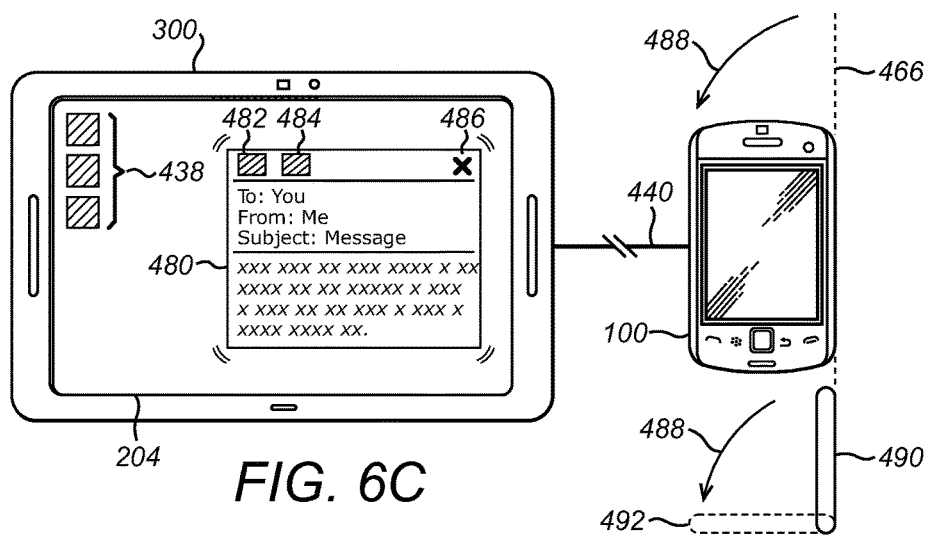

FIG. 6C illustrates that the display 204 of the second device 300 has changed in response to the detected tilt gesture of greater than 45 degrees, e.g., 90 degrees. In this example, when the processor 240 of the first device 100 detects a tilt angle of 90 degrees (or greater than 45 degrees), the processor 240 of the first device 100 generates and outputs data (i.e., third data) pertaining to the entire received message, including the body of the message, to the second device 300. The third data is used by the processor 240 of the second device 300 to generate the message window 480 illustrated in the figure. This may be referred to as snapped or fully blended, since the message is now fully detached from the side of the display 204. It will be appreciated that snapped is opposite to blend. When the message object 480 is in this snapped mode of operation, and the display object (i.e., message window 480) is detached, a user may be provided with an indication that this has been done, for example, the user may be provided with a message (not shown) or the full bend window may include further selectable display icons such as a cross 486 indicative of closing the window, or display icons for responding 482 or forwarding 484 the message. Once the message is snapped with the display of the second device 300 the user may select one or more of the selectable icons using the input controls of the second device 300. In an alternative example, when the user tilts the first device 100 to an angle of greater than 45 degrees, a message response window is displayed on the second device in response to data received from the first device 100. Again, the response window may include selectable icons such as send and an icon for attaching files from the second device 300 when replying to the message. It will be appreciated that when a response is sent, data is transferred to the first device 100 by the processor 240 of the second device to send such a response. Once the message 480 is snapped and is fully incorporated with the display 204 of the second device 300, the first device 100 can be returned to the starting position of being against a surface, as illustrated by the before 490 and after 492 end views of the first device 100 and the angle of rotation 488.

Accordingly, a user is provided with control of data pertaining to display objects output from a first device to a second device using the first device as a control input. The display objects are generally described as being visual herein. However, the display objects may be audible or tactile. For example, the initial display object described in association with FIG. 6A may be provided by the processor 240 of the second device 300 emitting an audible sound to indicate that a message has been received.

Figure 7A:
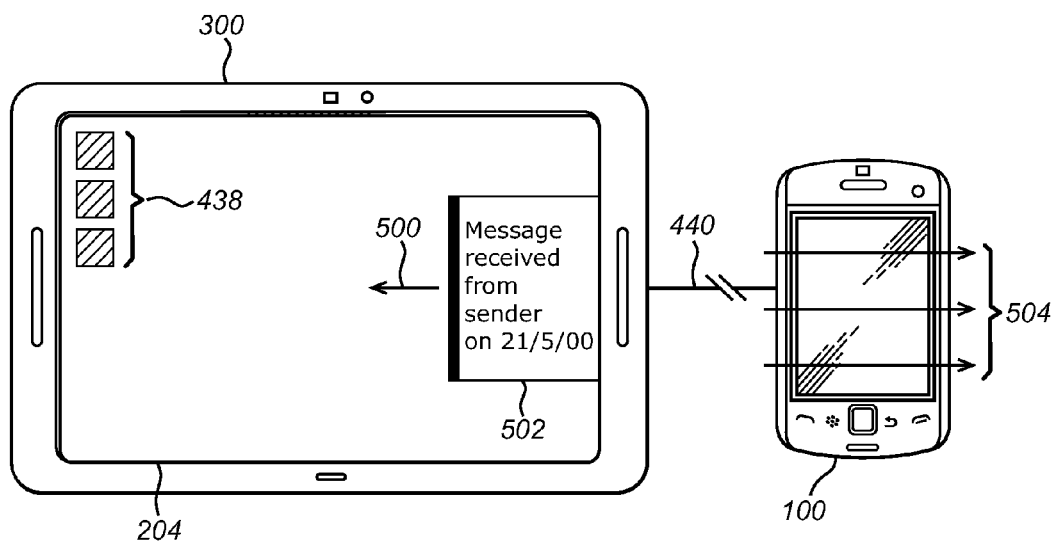
FIGS. 7A and 7B illustrate the two devices illustrated in FIGS. 2 and 3 in communication with one another showing how a display object may be handled in a third embodiment.
Figure 7B:
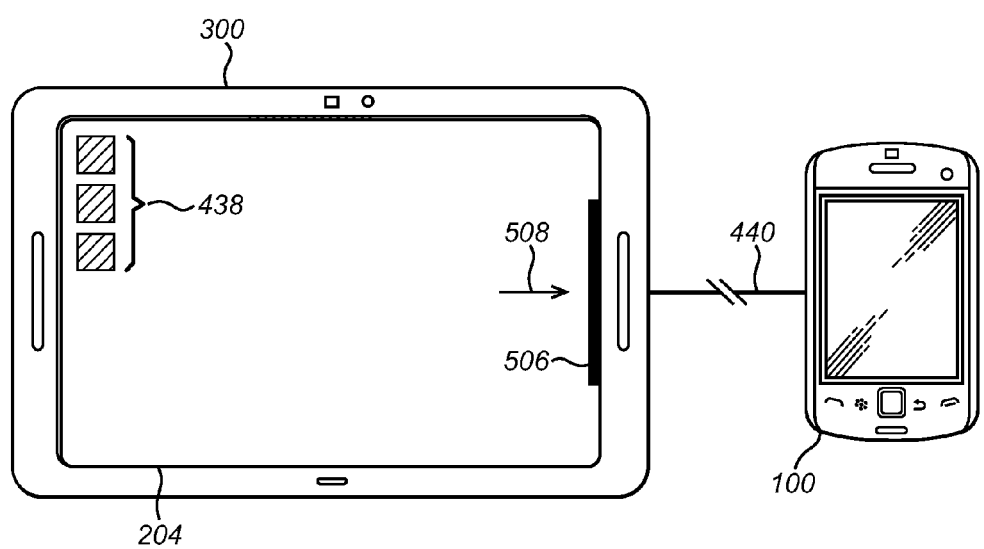

FIG. 7A illustrates a third embodiment. In FIG. 7A, data pertaining to a display object is output by the processor 240 of the first device 100 to the second device 300 to generate a display object 502 displayed on display 204 of the second device. As before the display object appears on the right hand side of the display 204 as indicated by arrow 500 when the display object data is received from the first device 100. The display object 502 contains only the information regarding the sender of the message and the date on which the message was received. The user may decide not to take any action on the display object, so performs a gesture of moving a hand, for example, over the first device 100. This will typically be performed without contacting the surface of the first device 100, but it will be appreciated that the gesture may also be performed by swiping a finger or fingers over the display screen 204 of the first device 100. The gesture is detected by the touch screen overlay, but may also be detected using the camera 253. In response to detecting the gesture, the processor 240 of the first device 100 outputs data pertaining to the display object to remove the display object from the display 204 of the second device 300. This is illustrated in FIG. 7B, where the display object is reduced as indicated by the arrow 508 to a display icon 506, indicating that further display objects may be received. In this example, if the user takes no action in response to the display object being displayed, the display object may remain displayed for a predetermined time before be reduced. The predetermined time in this example is an integer value between 1 and 5 minutes (e.g., 1, 2, 3, 4 or 5 minutes), since the first device 100 is face-up indicating that the user is interested in receiving display objects and possibly acting upon receiving such display objects. In this example, the user may also use a different gesture, for example, a left to right shake of the first device 100 detected by the accelerometer coupled to the processor 240.

Accordingly, the user is able to perform a gesture, typically without looking at the first device 100 to locate a selectable display icon, to remove the display object.

Figure 8A:
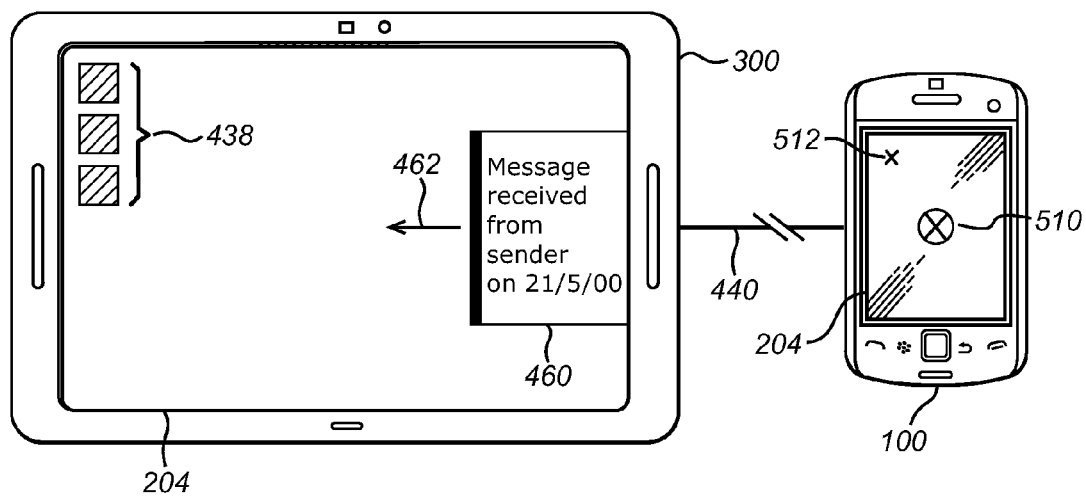
FIGS. 8A and 8B illustrate the two devices illustrated in FIGS. 2 and 3 in communication with one another showing how a display object may be handled in a fourth embodiment.
Figure 8B:
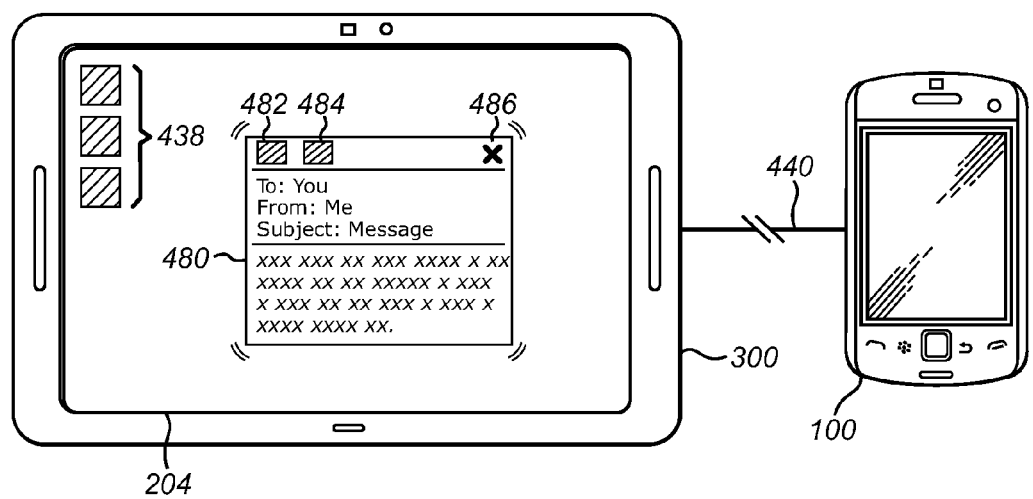

FIG. 8A illustrates a fourth embodiment. In FIG. 8A, the display 204 of the second device 300 is similar to the display 204 illustrated in FIG. 6A and shows a display object 460 generated from data received from the first device 100. In this example, when the first device 100 generates the data pertaining to the display object, the processor 240 of the first device also generates a display icon 510 (a cross contained within a circle) that is output to the display 204 of the first device 100. The icon 510 indicates to the user that a tap gesture anywhere on the touch screen of the first device 100, e.g. point 512, will cause the processor 240 of the first device 100 to generate and output data to cause the message display object to be departed from the edge of the display 204 of the second device 300 and become fully blended. A fully blended message 480 is illustrated in FIG. 8B and corresponds to the message illustrated in FIG. 6C, where the same reference numerals are used for like features.

Accordingly, the user is provided with a straight forward technique for interacting with the first device 100 to provide data pertaining to display objects to the second device 300 and to update or change the data provided to the second device 300 based on interactions with first device 100. It will be appreciated that each of the example actions and associated gestures have been described in isolation, but may be combined.

In an example, one or more of the input devices of each of the first and second devices 100, 300 may be used by the respective device to determine which device is currently being used or is currently active. For example, a user may have previously established a communication connection between the first and second devices 100, 300 but is reviewing files, e.g., images or songs, stored on the first device 100 when a message is received by the first device 100. Since the user is currently viewing the display 204 of the first device it is not necessary to output a display object to the second device 300. Accordingly, while the two devices 100, 300 are in communication with one another the camera 253 of the first device 100, for example, detects if a user is currently viewing the display 204 of the first device 100 by detecting for movement near or in proximity to the device 100. If the processor 240 of the first device 100 detects that a user is currently viewing the display 204 of the first device 100 based on data received from the camera 253, the processor will not output display object data to the second device 300. Similarly, a camera 253 of the second device 300 may be used to determine which device is currently being used is or active. Other input devices other than the camera 253 may be used to detect which device is currently in use such as the ones described above including, for example, a microphone 258, or the touch-sensitive overlay on the display 204.

In an embodiment, an application executable on the processor 240 of the second device 300 may monitor messages, notifications, alerts, etc. that are displayed on the display 204. Such an application may form part of the Bridge application. This monitoring is performed so that display objects, for example, that are already displayed on the display 204 of the second device 300 are not duplicated in a message display object based on data received from the first device 100. The application executable on the processor 240 of the second device 300 monitors the messages and alerts, etc. that are being displayed by an application running on the processor 240 of the second device 300, for example an email application. When data pertaining to a display object is received from the processor 240 of the first device 100, the monitoring application determines whether or not the received data pertains to a unique message. That is to say that the application monitoring displayed and incoming messages determines whether or not the received data pertains to a message or display object that is not already being displayed on the display 204 of the second device 300. If the display object application determines that a display object or other form of display already exists for the message or display object described in the received display object data, a further display object is not displayed. Of course, if no other display or display objects exist for a received message, i.e., the message or display object is unique, a display object can be displayed as described above. Accordingly, display objects and/or the information contained therein are not duplicated.

The location of a display object on the display 204 may be related to the relative position of the first device 100 and the second device 300. For example, if the first device 100 is placed adjacent to or on the right hand side of the display 204, display objects appear on the right of the display 204 of the second device 300. This may be achieved using user settings of the second device 300. For example, during set-up of the operating system of the second device 300 the user may be prompted if they are right or left handed which may alter the manner in which a user makes gestures on the screen. For example, a right handed person may be more likely to place the first device 100 on the right of the second device 300 when using the second device 300. Accordingly, for a right handed user, the display objects are displayed on the right hand side of the display 204. Furthermore, during the set-up of the Blackberry Bridge, the user may be prompted to enter on which side of the display objects should appear, or similarly a user may be prompted if they are right or left handed. Thus, the display objects are displayed on the display 204 of the second device 300 on a side of the display that is most likely to be adjacent the first device 100, from which the display object originates.

In some examples, even when two devices are able to communicate over an established connection, data pertaining to a display object may not be sent between the devices if the processor 240 of either device determines that the distance between the two devices exceeds a predetermined threshold that it will not be useful to provide the display objects. For example, the strength of the signal of a wireless connection may be used to determine the distance between the two devices. In one embodiment, when the proximity between the first processor and further device is determined to be more than a predefined distance, e.g. than 50 m, 40 m, 30 m, 20 m, 10 m, 9 m, 8 m, 7 m, 6 m, 5 m, 4 m, 3 m, 2 m, 1 m, 0.5 m, 0.2 m or 0.1 m, the processor 240 of a first device may not deem it necessary to output display objects to a second device for which an established connection exists. The relative position between devices may also be determined with one or more sensors present on either of the first electronic device 100 or the second electronic device 300, such as cameras or ultrasonic sensors and detectors. For example, the first electronic device 100 may output a signal (e.g., ultrasonic, sound, display) which is detected by the second electronic device 300 with a corresponding sensor, which is used to determine the relative position of the two devices 100, 300.

The display objects described herein may relate to one or more of a received message, diary alert, reminder, received data, data feeds, or a status update. A display object may also relate any form of displayable icon, window or object that is displayable on the display 204 of the second device 300 in response to a detected gesture. For example, if a user performs a gesture of shaking the first device 100 from side-to-side, the processor 240 of the first device 100 may output data to the second device pertaining to a displayable icon or object. In this example, the displayable icon and the display object are the same. This is because the display of the displayable icon will act as a notification that an action has been completed and the displayable may also offer a user with an additional function. For example, the displayable icon may represent a link to a predetermined location in memory (memory 244) of the first device 100, which may be referred to as a drop target. Accordingly, if a user performs a side-to-side gesture, detected by the first device 100, a display object in the form of a displayable icon (i.e., drop target) is provided to the user to allow the user to move or copy files from a memory of the second device 300 to a predetermined area of memory on the first device 100.

FIG. 9 illustrates a device according to a fifth embodiment. In FIG. 9, an apparatus 550 is illustrated that may be used in conjunction with the first device 100 when the first device 100 is in communication with the second device 300, including establishing the communication channel. The apparatus 550, for example, is a mat. The apparatus 550 may comprise a recessed surface 558 shaped to receive a mobile device, for example the first device 100. The surface 558, which may not be recessed, comprises a near field communication (NFC) circuit or tag or reader 560 and an induction coil 562. The NFC circuit or reader 560 may be used with corresponding readers or tags found within the first device to initiate the establishment of a communication connection. For example, multiple devices may be in range to communicate with another, but only those devices that are able to pair using the NFC circuits and readers establish a connection. Furthermore, the first device 100 may only output data pertaining to display objects when the respective NFC circuits and readers are able to communicate, i.e., when the first device 100 is placed on the apparatus 550. The induction coil or loop 562 couples to a similar device installed within or on the surface of the first device 100 to charge the battery 238, via the battery interface 236 of the first device 100. Accordingly, since the first device 100 remains active to the extent that the various sensors and input devices are active while data pertaining to display objects are output to the second device 300, the battery 238 will not become depleted because it is charged via the induction loop 562. A power connection that couples directly with the battery interface 236 may also be used. The apparatus 550 includes a cable 556 for connection with the second device 300, which may use, for example, USB. Such a connection will provide power to the apparatus 550 from the second device 300. The connection 556 between the apparatus 550 and the second device 300 may be provided using a wireless protocol in addition to providing a separate power source to the apparatus 550. The apparatus 550 is also provided with one or more sensors 552, 554. The sensors may include, but are not limited to, proximity sensors, infra-red (IR) sensors, e-field sensors or ultrasonic sensors. The apparatus 550 may include corresponding emitters, including infra-red, e-field or ultrasonic emitters that together with the respective sensor enable proximity detection. Accordingly, rather than using the sensors or input device of the first device 100, the input devices of the apparatus 550 may be used to detect gestures, thus saving the reducing the drain of the battery power which may result if the input sensors of the first device 100 are constantly detecting even if no gestures are being performed. Thus the gestures are still being performed at the first device 100 but detected using input devices or sensors adjacent to the first device 100. The association between the first device 100 and the input devices 552, 554 may be performed when the communication connection is established using the NFC circuits. Furthermore, during an installation process of the mat 500 the user may be asked which side of the second device 300 the apparatus 550 is arranged, e.g., left or right, so that display objects can be displayed on the same side of the display 204 of the second device 300 as the apparatus 550 location and thus the location of the second device 300.

FIG. 10 is a flow chart depicting a method 600 performed by the processor 240 of a first device 100 for controlling or handling data pertaining to a display object, as described herein. It will be appreciated that some of the steps are optional and may be performed in a different order than that described.

At block 602, the processor 240 of the first device 100 detects a gesture at the device using one or more input sensors.

At block 604, the processor 240 of the first device 100 generates data to control (e.g., generate or interact with) a display object on a portion of a display generated by a remote device. The data is generated based on an application executable on the device and in response to the detected gesture.

At block 606, the processor 240 of the first device 100 outputs the display object data for controlling the display object to the remote device.

Figure 11A:
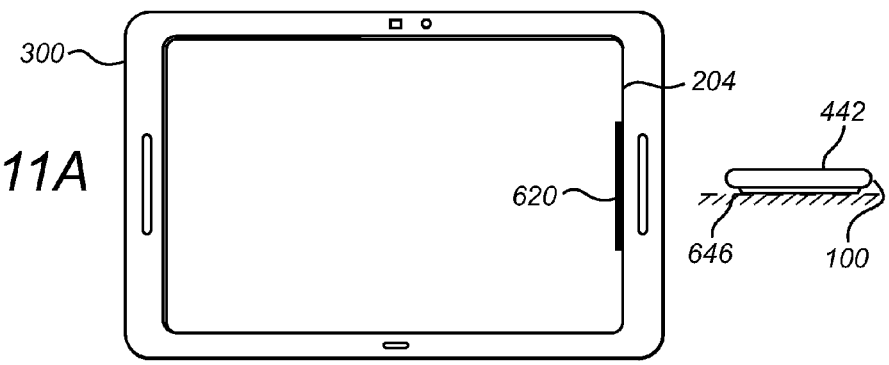
FIGS. 11A, 11B, 11C and 11D illustrate the two devices illustrated in FIGS. 2 and 3 in communication with one another showing how display data may be handled in a sixth embodiment.
Figure 11B:
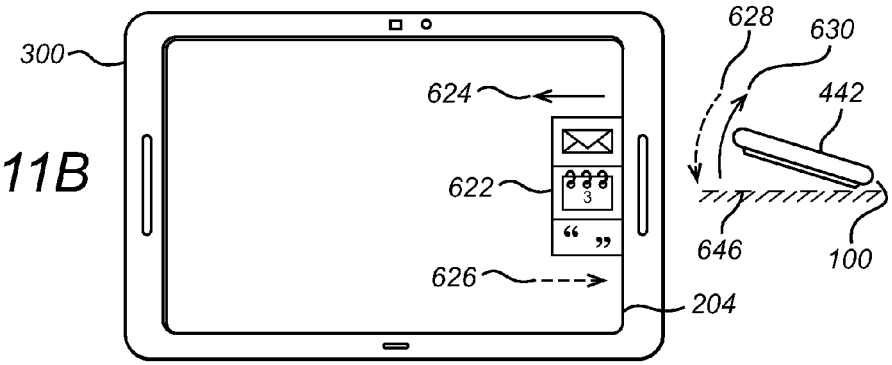
Figure 11C:
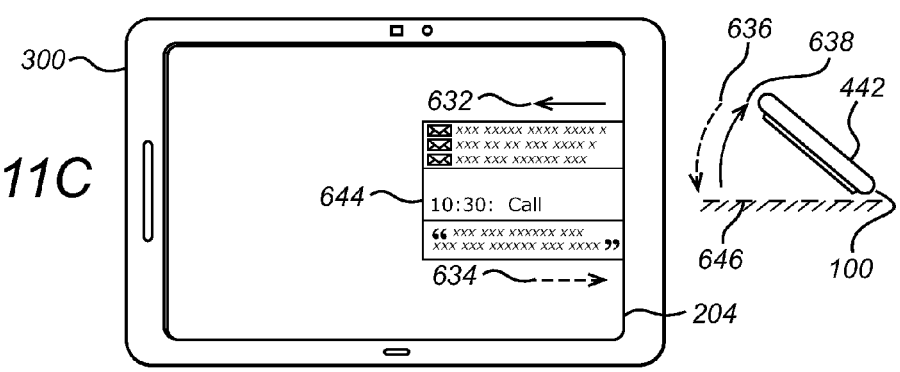
Figure 11D:
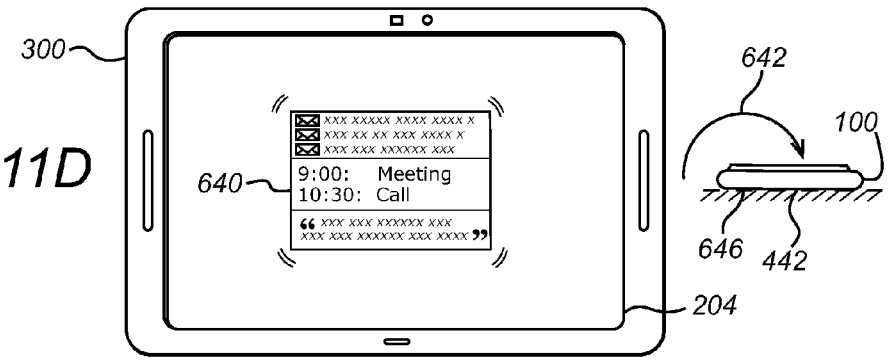

FIGS. 11A to 11C illustrate the first device 100 and second device 300 being used in a blending mode whereby movement or manipulation of the first device 100 causes interaction with the display object, such that it is itself manipulated, and such manipulation can can be reversed or undone by reversing the movement or manipulation of the first device 100. FIG. 11D illustrates the first device 100 and second device 300 being shown in a fully blended mode (also referred to as a snapped mode) whereby further movement or manipulation of the first device 100 causes no further interaction with or manipulation of the display object, so that the interaction with the display object which occurred during the blending mode cannot be undone by reversing the movement or manipulation performed during the blending mode.

FIG. 11A illustrates the first device 100 and the second device 300 with an established connection 440 according to a sixth embodiment. In this example, the first device 100 is face-down on a surface 646, which may be detected by a front facing camera 253. In the figure, the back 442 of the device 100 is illustrated as being face-up. The back 442 of the device 100 is the opposite to the front of the device which is considered to be a side of the device 100 which includes a display or main display. In the figure, a display icon 620 is generated for display on the display 204 of the second device 300. The optional icon 620 informs the user that the two devices 100, 300 are in communication and that data generated at the first device 100 can be output to the second device for display.

FIG. 11B illustrates a mode of operation of the first device 100 and the second device 300 using a tilt gesture. This may be referred to as peeking. In this example, an application running on the processor 240 of the first device 100 provides the user with a summary display of newly received messages, alerts, diary entries, etc. In the figure, a user performs a gesture to indicate that they would like to peek at or view the summary display of the first device 100. In this example, the gesture is a tilt of the device 100. As the user tilts the first device 100, upward, increasing the angle between the surface 646 and the device 100, indicated by arrow 630, the processor 240 of the first device 100 generates and outputs display object data to the second device in response to the detected tilt gesture. The output data is rendered by the processor 240 of the second device 300 and generates a display object 622. The display object 622 is visual representation of the summary display found on the first device 100 and includes, in this example, an indication that one or more email messages have been received, there are one or more diary entries entered for the current day and an instant message has been received. The display icon 622, displayed on the display 204 of the second device 300, moves in from the right hand side of the display 204, as indicated by arrow 624. The movement speed and movement amount is proportional to the speed and amount of the tilt gesture 630 performed at the device 100. That is to say that in this example as the user tilts the device the display icon appears dynamically in response to the gesture. For example, if the user tilts the device 100 quickly, the display icon 622 will appear quickly and if the user only tilts the device 100 a small amount (e.g., 5 to 10 degrees) from the surface 646, only a portion of the display icon 622 illustrated in the figure will be displayed. However, it will be appreciated that there may be a predetermined tilt angle at which the display object changes in overall appearance and further information is displayed than that of the display icon 622, as illustrated in FIG. 11C. If the user tilts the first device 100 back towards the surface 646, as illustrated by the dash arrow 628, data output by the processor 240 of the first device 100 to the second device 300 causes the size and appearance of the display icon 622 to be reduced as indicated by dashed arrow 626. Accordingly, the user is provided with a dynamic control of the display icon 622 based on the amount and direction of the tilt gesture performed at the first device 100.

In FIG. 11C, a user tilts the first device 100 further than that illustrated in FIG. 11B and optionally past a predetermined tilt angle. The first device 100 is tilted in a direction away from the surface 646 as indicated by the arrow 638. The processor 240 detects the tilt angle and outputs data for generating a display icon 644. In this example, if the tilt angle exceeds a predetermined threshold (e.g. 45 degrees) data for generating the display icon 644 is generated by the processor 240 of the first device 100 and is output to the processor 240 of the second device 300 for display. The display icon or object 644 is displayed to move in from the right hand side as the user tilts the device 100, as indicated by arrow 632. As above, the movement of the display icon 644 is proportional to the active tilting of the first device 100. It will be appreciated that the movement from display object 620, to display object 622 and to display object 644 may be displayed as a smooth transition from one object to the next as the user tilts the first device 100. As above, if the user tilts the first device 100 back towards the surface 646, as illustrated by the dash arrow 636, data output by the processor 240 of the first device 100 to the second device 300 causes the size and appearance of the display icon 644 to be reduced as indicated by dashed arrow 634. In this example, display object 644 includes details of three unopened email messages (e.g., date, sender and subject), two diary appointments and an instant message. It will be appreciated that there may not be a predetermined tilt angle threshold and the amount of the display object 644 displayed may be increased/decreased as the tilt angle of the first device 100 is increased/decreased. That is to say that the display object 620 may be translated directly to a portion of the display icon 644 as the device 100 is tilted and the greater the tilt angle the greater the proportion of the display icon 644 is displayed.

FIG. 11D illustrates a display object that is generated in response to a user tiling the first device 100 through 180 degrees such that the back 442 of the device 100 is on the surface 464. In this example, two sensors are used to determine a user has performed this action. The camera 253 is used to detect an amount of light incident on the front of first device 100, since as the first device 100 is tilted the amount of light detected will changed and in this example increase. The amount of light detected and the detected tilt angle are used to determine that the device has been rotated through 180 degrees and is placed face-up on the surface 646. It will be appreciated that there may also be a backward facing camera which may also be used to detect that the first device 100 is placed face-up, i.e., with back 442 of the device on the surface 646, when no or a low amount of light is detected.

In this example, when it is detected that the user has placed the first device 100 face-up, the processor 240 of the first device 100 generates and outputs data to the second device 300 to release the display object 644 illustrated in FIG. 11C from the edge of the display 204. The releasing of a display object is referred to as snapping or a snap of the display object. A snapped display object 640 is illustrated in the figure and contains the same information as display icon 644. Once the display icon is snapped from the edge of the display 204, the devices are in the fully blended mode and it is no longer possible to move it back to the blending mode by tilting the first device 100 in the opposite direction, as indicated by the dotted line between FIG. 11C and FIG. 11D. However, in one embodiment, a complete reversal of the device to its original position or configuration as shown in FIG. 11A can cause the display object to be immediately closed. When the display object 640 is snapped, it is possible to control the display object using input devices of the second device 300. Further, as described above, the user may be provided with a visual aid to inform him that the display object has been snapped. When display object 640 is snapped the data for generating the display object may be generated by the processor 240 of the first device 100 or the second device 300, but the control of the display object 640 will typically be provided by the second device 300.

Figure 12:
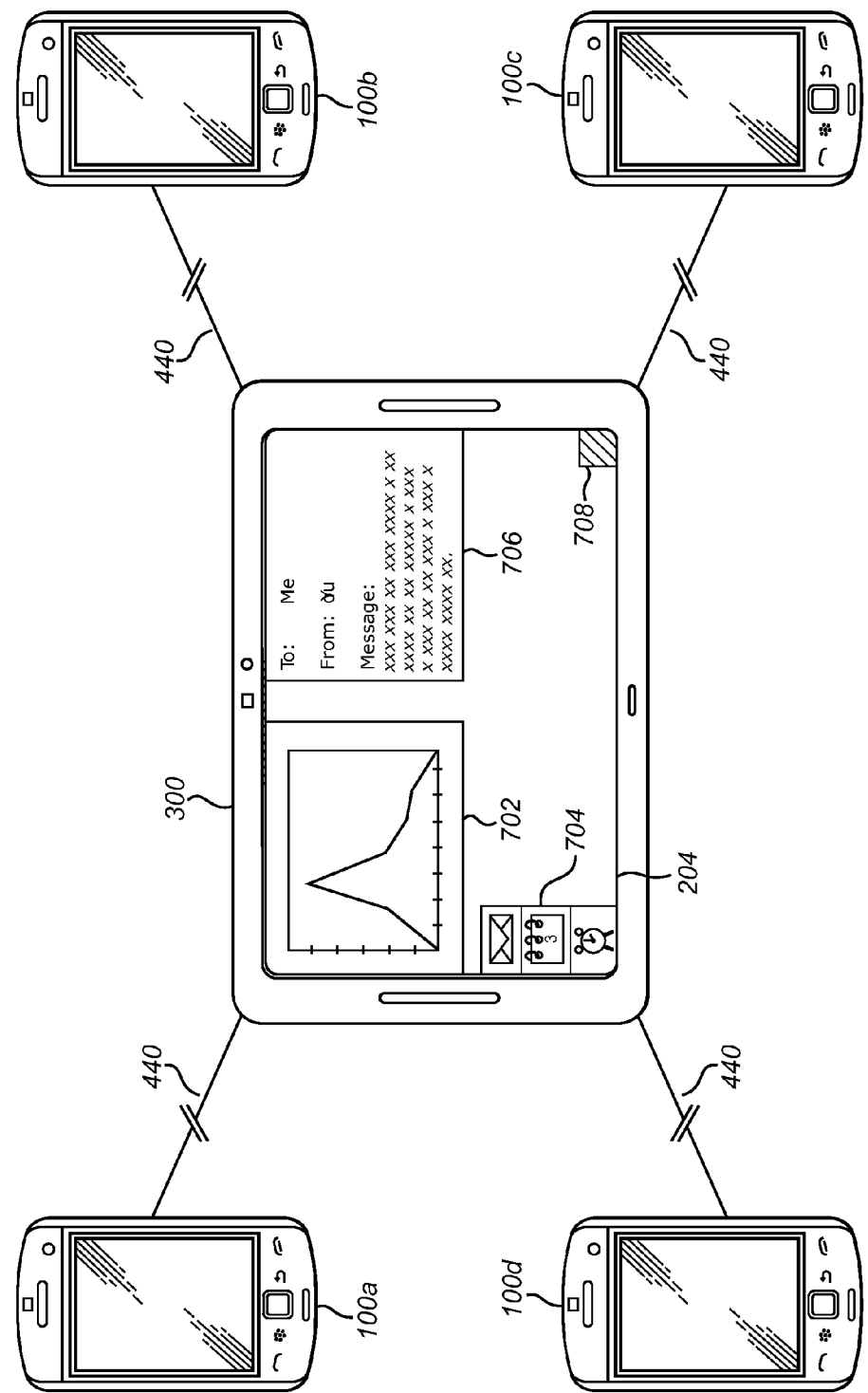
FIG. 12 illustrates multiple electronic devices in communication with a single electronic device to illustrate how multiple display objects may be handled in a seventh embodiment.
Figure 13:
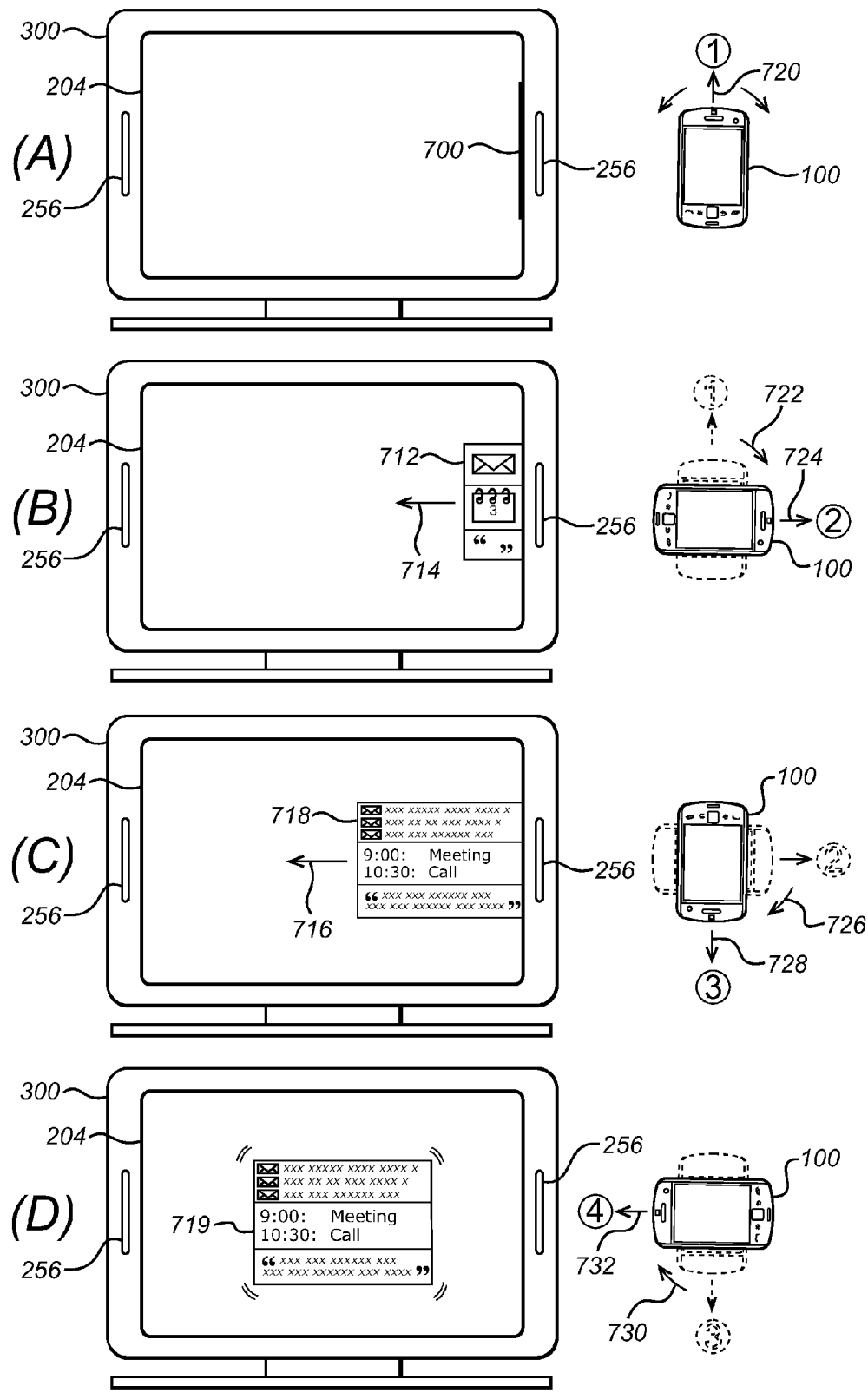
FIGS. 13A, 13B, 13C and 13D illustrate the two devices illustrated in FIGS. 2 and 3 in communication with one another showing how display data may be handled in an eighth embodiment.
Figure 14:
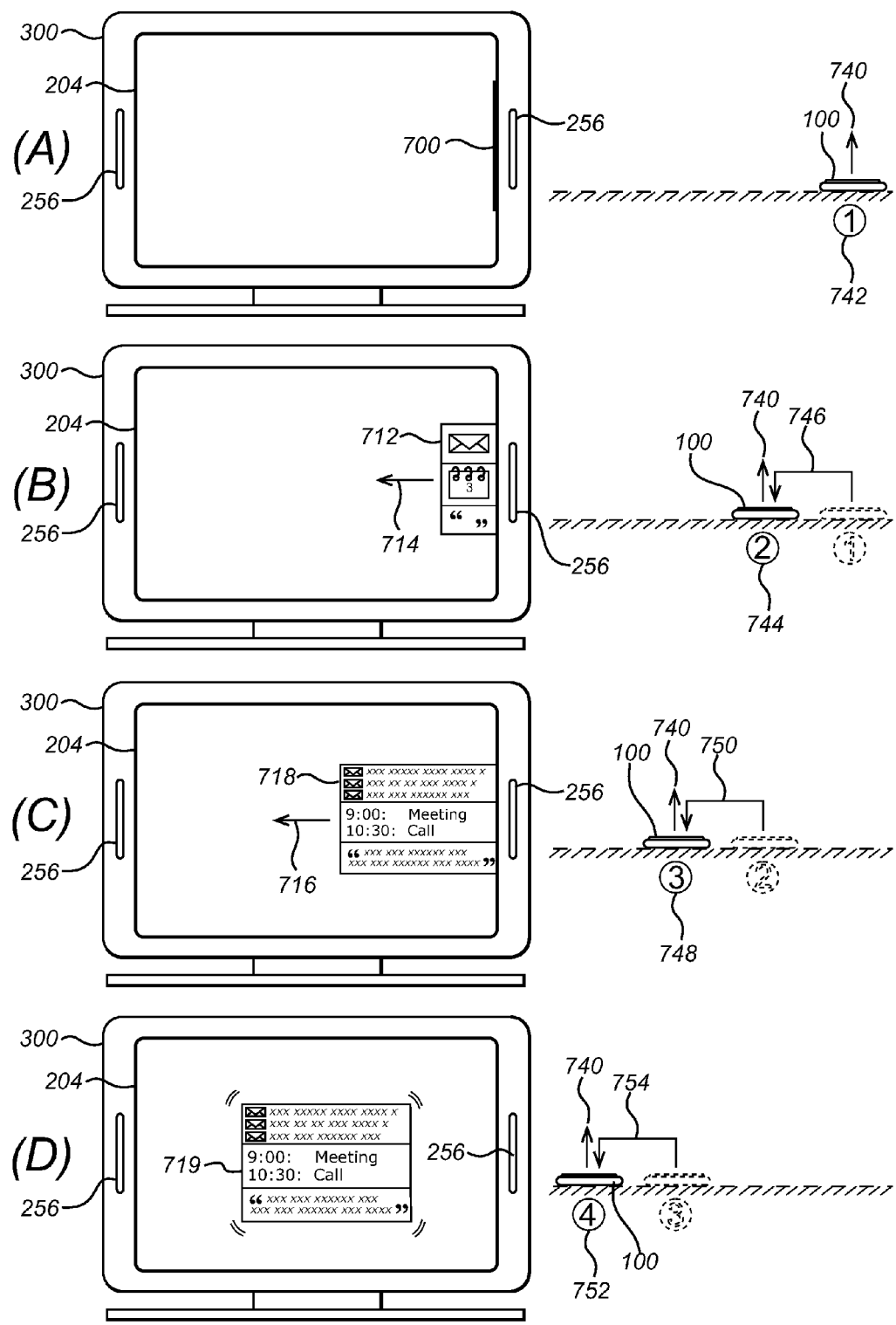
FIGS. 14A, 14B, 14C and 14D illustrate the two devices illustrated in FIGS. 2 and 3 in communication with one another showing how display data may be handled in a ninth embodiment.
Figure 15:
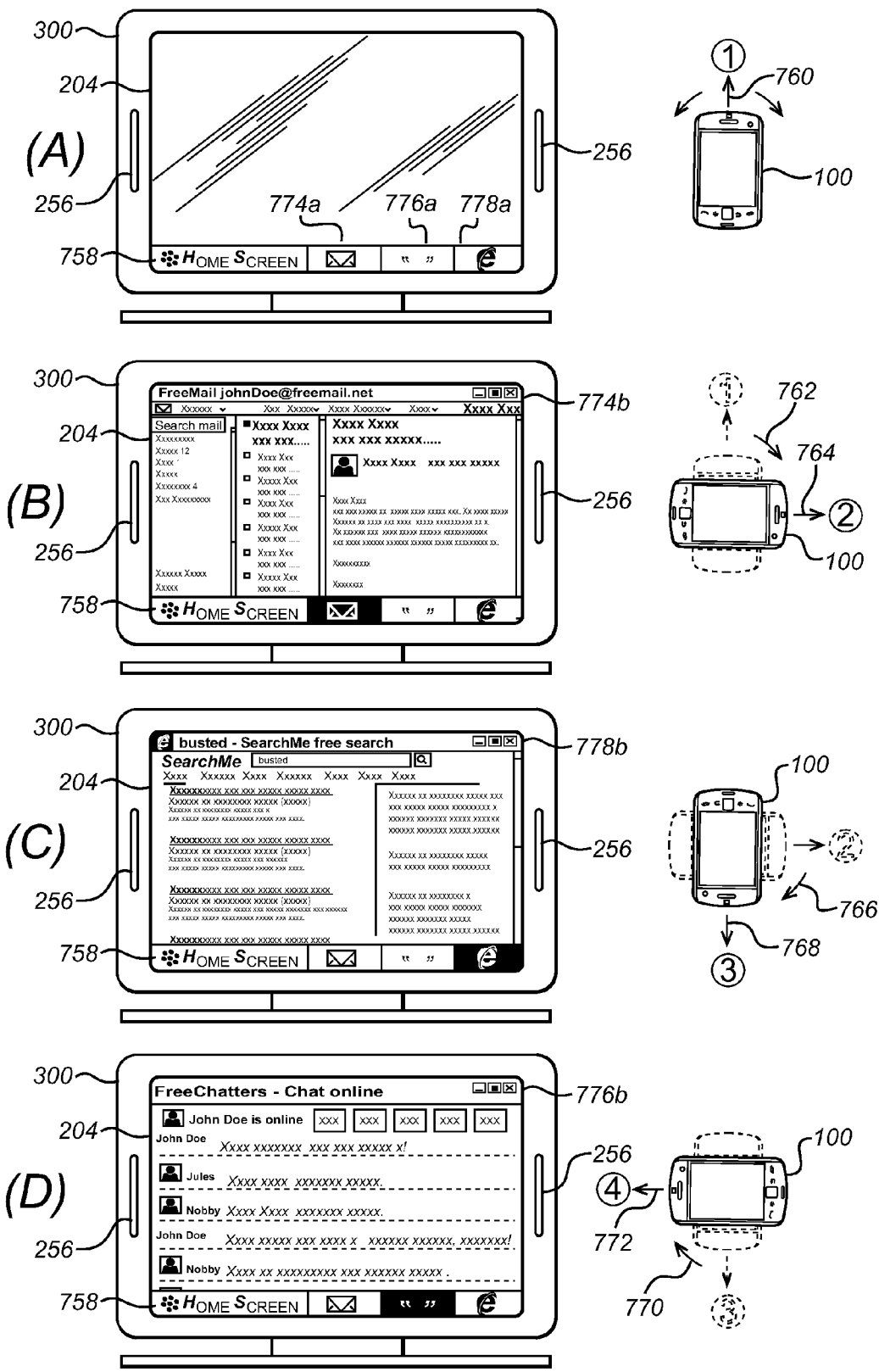
FIGS. 15A, 15B, 15C and 15D illustrate the two devices illustrated in FIGS. 2 and 3 in communication with one another showing how control data may be handled in a tenth embodiment.

FIG. 12 illustrates an electronic device 300 that is in communication with multiple other electronic devices 100a, 100b, 100c, 100d according to a seventh embodiment. Device 100 and device 300 correspond to the devices illustrated in FIGS. 2 and 3. Each of the four electronics devices 100a, 100b, 100c, 100d is remote from the electronic device 300 and in communication with the electronic device 300, as illustrated by the broken lines 440. The communication link 440 may be provided by any form of wired or wireless connection as described above. In this example, the electronic device 300 represents a large screen electronic device that is being viewed by multiple users. For example, electronic device 300 may be a wall mounted display device in a conference room or similar. Alternatively, electronic device 300 may be a tablet device placed on a table or desk that is being viewed by multiple users.

In this example, each of the devices 100a, 100b, 100c, 100d is capable of transmitting data for generating a display object or component on the display 204 of electronic device 300, as described above, but in on a one-to-one basis. The electronic device 100a in the top left of the figure is outputting data for generating the display icon or display object 702 illustrated in the top left corner of display 204 of the electronic device 300. In this example, the display icon 702 represents a graph and may form part of a presentation, for example. The display object data for generating display object 702 is output or transmitted from device 100a in response to a gesture detected at device 100a. For example, the user of device 100a may have identified a file containing the graph illustrated to share with others by storing the graph in a predefined location in memory and assigning a gesture to the file. Alternatively, an application that is currently active or running on the processor 240 of device 100a includes the graph illustrated in the figure, such that when the user performs a predefined gesture, the processor 240 of the device 100a generates and outputs data for generating the display icon 702. For example, the user assigns a shaking gesture. It will be appreciated that it is not necessary for the user to assign a gesture to a specific file or object. Rather, the application described above that is active on the device 100a for generating the display object data, outputs display data based on an application that is currently active or most recently viewed in response to a detected gesture, for example, a shaking gesture of electronic device 100a.

The electronic device 100c illustrated in the bottom right corner of the figure is not currently outputting any data for display on the electronic device 300, and an optional display icon 708 is generated in the bottom right corner of the display 204 of the electronic device 300 to indicate that there is a connection established between the electronic device 100c in the bottom right corner of the figure and electronic device 300 and data for display object 708 may be provided by the processor 240 of device 100c or device 300.

The electronic device 100d in the bottom left corner of the figure is outputting display data for generating the display icon 704 illustrated in the bottom left corner of the display 204 of electronic device 300. Display icon 704 is representative of a summary display received from electronic device 100d to illustrate received, unopened, messages, diary entries and alerts, for example. If the user of electronic device 100d wishes to display the display icon 704 on electronic device 300, the user performs a predetermined gesture associated with generating the display icon 704, In the example, the user of electronic device 100d turns his device from being face-down on a surface to being face-up. The user of device 100d performs the predetermined gesture so that content on electronic device 100d can be shared with other users, who do not typically have access to device 100d.

The electronic device 100b in the top right corner of the figure is outputting display data for generating the display icon 706 illustrated in the top right left corner of the display 204 of electronic device 300. Display icon 706 is a display of a message from electronic device 100b. The displayed display icon 706 is a message predetermined by the user to be displayed on the display 204 of electronic device 300. For example the user of electronic device 100b may have marked the message as "for group display" or "share" and associated a gesture with it, for example a shaking gesture performed at device 100b. Thus, when the user of electronic device 100b performs the assigned gesture, display data for generating a display icon or object is output to the electronic device 300. Alternatively, the message may be open or saved/stored in a predetermined location for sharing, and a gesture detected by electronic device 100b causes data to be output to electronic device 300 to generate the display icon 706.

In an alternative embodiment, a gesture may be assigned to currently active or open applications or components. For example, if a user is viewing a presentation on his electronic device, a predetermined gesture may be performed at the electronic device 100 to generate display data, which is subsequently output to electronic device 300 for display.

In this example, the data which is generated by any one, or all, of the electronic devices 100a, 100b, 100c, 100d and output to the electronic device 300 may be data which when rendered by the processor 240 of the electronic device 300 causes a display object to be generated. Alternatively, the data generated and output to electronic device 300 may be data from or associated with an application or component active or executable on the device 100a, 100b, 100c, 100d, such that the processor 240 of the electronic devices 100a, 100b, 100c, 100d generates display data based on the received application data, which is rendered for display.

FIGS. 13A to 13D illustrate a first electronic device 100 and a second electronic device 300 according to an eighth embodiment. In this example, the first electronic device 100 is a handheld communications device and comprises at least a subset of the components described in association with FIG. 1. The second electronic device 300, in this example, is a desk-top style computer comprising at least a subset of the components described in association with FIG. 1 and including at least a processor 240, memory (e.g., one or more of flash memory 244, random access memory (RAM) 246, read only memory (ROM) 248), a display 204 and an input device (not shown). The two electronic devices 100, 300 are in communication with one another such that any establishment of a connection has already been performed. For example, the two devices may establish a wireless connection using Bluetooth® or a wired connection using USB, as described above. The communication connection is not shown in the figure for ease of illustration.

In this example, the first electronic device 100 generally generates and outputs data to the second electronic device 300 for display. The second device 300 may be described as a remote device to the extent that it is remote from the first device 100. The outputted data may include any data from an application currently running or active on the processor 240 of the first device 100, and may be, for example, data relating to received messages, diary alerts, reminders, received data, data feeds, or status updates. The transfer of data between the first device 100 and the second device 300 is performed in examples described herein using the Blackberry Bridge. However, other protocols that allow messages, feeds, notifications and similar to be pushed to or transferred to the second device 300 from the first device 100, for example Link. Furthermore, in the examples described herein the first device 100 and the second device 300 have installed thereon an executable application to allow the first device 100 to push data to the second device 300.

FIGS. 13A to 13D illustrate the first electronic device 100 and the second electronic device 300 being used in a blending or blend mode whereby movement or manipulation of the first device 100 to one or more discrete, or predetermined, positions causes interaction with a display object displayed on the second electronic device 300 based on data received from the first electronic device 100. Thus the display object is manipulated, and the manipulation can be reversed or undone by returning or moving the first electronic device to one of the other discrete positions. In this example, a gesture or movement of the first device 100 is performed by a user and is detected using one or more motion sensors (e.g., the orientation subsystem 249, which may include a gravity sensor, a gyroscope, a tilt sensor, an electronic compass or other suitable sensor, or combinations thereof) of the first electronic device 100. In this embodiment the first electronic device 100 is placed face up (i.e., the display 204 is face up) on a surface, for example, a desk top surface on which the second electronic device 300 is also placed. In addition to detecting the gesture performed at the first electronic device 100, the processor 240 of the first electronic device 100 may also detect the proximity of the first device 100 to the surface upon which it is placed. The proximity of the first device 100 with a surface may be detected using a backward facing camera (i.e., a camera positioned on a face opposite to the front face of the first device 100) if the first device 100 is placed face up during operation. Alternatively, if the first device 100 may be placed faced down during operation, the front facing camera 253 may be used to detect the proximity of the first device 100 with a surface. Other appropriately positioned light or electromagnetic radiation sensors, positioned on the first electronic device 100, could also be used. The proximity of the first device 100 to a surface may be deemed to be at the surface, i.e., in contact with the surface, or may be deemed to be a predetermined distance from the surface, e.g., 1, 2, 3, 4 or 5 mm away from the surface. In this example, the processor 240 of the first electronic device 100 optionally determines that the first electronic device 100 is in contact with the surface before detecting and/or registering the position of the first device 100.

The processor 240 of the first electronic device 100 determines that the position at which the first electronic device is placed on the surface is a first or home position 720. The first or home position 720 of the first electronic device 100 is represented by the numeral 1 in the FIG. 13A. In the figure, a display icon 700 is generated for display on the display 204 of the second device 300 based on data generated and transmitted by the processor 240 of the first electronic device. This, optional, icon 700 notifies a user that the two electronic devices 100, 300 are in communication and that data generated at the first device 100 can be output to the second device 300 for display.

FIG. 13B illustrates a mode of operation of the first device 100 and the second device 300 using a rotation, which may be referred to as a gesture, performed with the first electronic device 100. In this example, an application running on the processor 240 of the first device 100 provides the user with a summary display of newly received messages, alerts, diary entries, etc. In the figure, a user performs a rotation 722 of the first electronic device 100 from the home position 720 or position 1 through 90 degrees, in this example, to a second position 724 or position 2. The rotation 722 of the first electronic device 100 along a rotational path is detected, in this example, using one of the motion sensors (e.g. a gyroscope). Once the first device 100 has been rotated in a rotational path 722 to the new position 724, the processor 240 of the first device 100 generates and outputs display object data to the second device 300 in response to the detected movement. It is noted that in this example, any movement that is performed that does not result in the first device 100 being moved to one of the discrete positions does not result in a change of the display object data. The output data from the first electronic device 100 is rendered by the processor 240 of the second device 300 and generates a display object 712. The display object 712 is a visual representation of a summary display that could be viewed on the first device 100 and includes, in this example, an indication that one or more email messages have been received, there are one or more diary entries entered for the current day and an instant message has been received at the first electronic device 100. The display icon 712, displayed on the display 204 of the second device 300, moves in from the right hand side of the display 204, as indicated by arrow 714 after the first electronic device 100 is moved to the second position 724.

In FIG. 13C, a user rotates 726 the first electronic device 100 through a further 90 degrees (i.e., a total of 180 degrees from the home position 720) from the second position 724. The processor 240 of the first device 100 detects the rotational movement thereof to a third position 728 or position 3. In response to the movement to the third position 728, the processor 240 of the first electronic device 100, generates and outputs data for generating a display icon 718 and is output to the processor 240 of the second device 300 for display. The display icon or object 718 is displayed to move in from the right hand side once the device is moved to the discrete position 728, as is indicated by arrow 716. As above, only if the first electronic device 100 is moved to the third discrete position 728 is data output to the second electronic device 300 to update display object 712 to display object 718.

FIG. 13D illustrates a display object that is generated in response to a user rotating 730 the first electronic device 100 through a further 90 degrees (i.e., a total of 270 degrees from the home position 720) from the third position 728 to a fourth position 732. The processor 240 of the first device 100 detects the rotational movement thereof to the fourth position 732 or position 4. In response to the movement to the fourth discrete position 732, the processor 240 of the first electronic device 100, generates and outputs data for generating a display icon 719 to the processor 240 of the second device 300 for display. As above, only if the first electronic device 100 is moved to the fourth discrete position 732 is data output to the second electronic device 300 to update display object 718 to display object 719. In this example, when it is detected that the user has rotated the first device 100 to position 4, the processor 240 of the first device 100 generates and outputs data to the second device 300 to release the display object 718 illustrated in FIG. 13C from the edge of the display 204. The releasing of a display object 718 is referred to as snapping or a snap of the display object. A snapped display object 719 is illustrated in the figure and contains the same information as display object 718. Once the display icon is snapped from the edge of the display 204, it may be possible to control the display object using input devices of the second device 300. The user may be provided with a visual aid to inform him that the display object has been snapped. When display object 718 is snapped the data for generating the display object may be generated by the processor 240 of the first device 100 or the second device 300, but the control of the display object 640 will typically be provided by the second device 300.

Each of the positions numbered 1 to 4 are discrete positions that are equidistant from one another in this example. Moreover, the discrete positions are predetermined positions that are angularly or arcuately separately along a rotational or circular path. The angle of separation is in the range from 5 to 180 degrees. A user may rotate the first electronic device to any one of the four discrete positions and the display object will be updated based on data received from the processor 240 of the first electronic device 100 to become one of the display objects illustrated in FIGS. 13A to 13D. For example, if the first electronic device 100 is returned or moved to the home position 720, only the display object 700 would be displayed on the display 204 of the second electronic device 300 based on data received from the first electronic device 100. It will be appreciated that the home position 720 may be associated with a null display object. This is to say that a null display object may be represented by removing all display objects currently displayed on the display 204 of the second electronic device 300 that are associated with applications executable or active on the first electronic device 100 in this example.

In the figures, the first electronic device 100 is illustrated as being rotated about its centre point. However, it will be appreciated that the rotation may be performed about at a different point of the first electronic device 100, for example, a corner. The angles in this example are multiples of 90 degrees, but more or less increments may be used for example, between 5 and 180 degrees, depending on the number of different types of display or display objects envisaged. For example, there may be two different positions each separated by an angle of 180 degrees, three different positions each separated by an angle of 120 degrees, or five different positions each separated by an angle of 72 degrees and so on. Also it may not be necessary to use equidistant positions. It is envisaged that the processor 240 of the first electronic device 100 when detecting the position of the first electronic device 100 determines that the first device 100 has been rotated to a position if the device is moved to a position that is within a predetermined angular position of the predetermined discrete position. For example, the processor 240 may determine that the first device 100 has been moved to a discrete position if the device 100 is detected as being within +/−1, 2, 3, 4, or 5 degrees of the discrete position.

The processor 240 of the first electronic device 100 may also only register or determine that the device 100 has reached one of the discrete positions when the first electronic device 100 has remained at a position for a predetermined length of time, for example, 1, 2, 3, 4, 5, 6, 7, 8, 9 or 10 seconds. This is to say that the position of the first electronic device 100 is only registered if the device 100 remains stationary for a predetermined time. For example, if the first device 100 is moved from the home position 720 (FIG. 13A) to the third position 728 (FIG. 13C) without remaining stationary at the second position 724 (FIG. 13B) for more than 1 second, the processor 240 of the first electronic device 100 does not register that the device 100 was moved to position 2. Rather, the processor 240 of the first device 100 simply performs the actions associated with position 3, without performing the actions associated with position 2.

The home or first position 720 may be determined based on the position that the first device 100 is placed on a surface. This is to say that the home position 720 is the position of the first electronic device 100 when it is placed on the surface. Alternatively the home position 720 may always be north, or some other arbitrarily user selected position. When the processor 240 of the first device 100 detects that the device 100 is going to be used as a control device (e.g., it is placed on a surface with an established communication connection, and the user has optionally launched an appropriate application) the processor 240 of the first device may display a display object on the display 204 of the first device 100 or the second device 300 to inform the user of the direction in which the first electronic device 100 is facing to enable the user to rotate the device to a home position. For example, a compass may be displayed on the display 204 of the first electronic device 100 to allow the user to rotate the first device 100 to a home position, which is for example north. It will be appreciated that the user does not generally view the display 204 of the first electronic device 100 when using the device 100 as a control device.

In a further example, the processor 240 of the first electronic device 100 may detect the absolute orientation of the device 100 to determine if the device is level with respect to gravity based on signals or data received from the orientation subsystem 249, e.g., a gyroscope, a tilt sensor, gravity sensor, or combinations thereof. The detected orientation of the first device 100 may be used in combination with determining if the first device 100 is placed on a surface, as discussed above, before registering the movement of the first device 100 to one of the discrete positions.

FIGS. 14A to 14D illustrate a first electronic device 100 and a second electronic device 300 according to a ninth embodiment. In this example, the first electronic device 100 is a handheld communications device and comprises at least a subset of the components described in association with FIG. 1. The second electronic device 300, in this example, is a desk-top style computer comprising at least a subset of the components described in association with FIG. 1 and including at least a processor 240, memory (e.g., one or more of flash memory 244, random access memory (RAM) 246, read only memory (ROM) 248), a display 204 and an input device (not shown). The two electronic devices 100, 300 are in communication with one another such that any establishment of a connection has already been performed. For example, the two devices may establish a wireless connection using Bluetooth® or a wired connection using USB, as described above. The communication connection is not shown in the figure for ease of illustration.

In this example, the first electronic device 100 generally generates and outputs data to the second electronic device 300 for display. The operation of the first electronic device 100 is similar to that describe for the electronic device 100 described in associate with FIGS. 13A to 13D except for the movement is linear rather than rotational.

The processor determines that the position at which the first electronic device 100 is placed on the surface is the first or home position 742. The first or home position 742 of the first electronic device 100 is represented by the numeral 1 in the FIG. 14A. Also, in this example, the first electronic device 100 is placed face up 740, but may equally be placed faced down. In the figure, a display icon 700 is generated for display on the display 204 of the second device 300 based on data generated and transmitted by the processor 240 of the first electronic device 100. This, optional, display object or icon 700 notifies a user that the two electronic devices 100, 300 are in communication with one another and that data generated at the first device 100 can be output to the second device 300 for display.

FIG. 14B illustrates a mode of operation of the first device 100 and the second device 300 using a linear movement, which may be referred to as a gesture, performed with the first electronic device 100. In this example, an application running on the processor 240 of the first device 100 provides the user with a summary display of newly received messages, alerts, diary entries, etc. In the figure, a user performs a linear movement 746 of the first electronic device 100 from the home position 742 or position 1 to an adjacent position a predetermined distance away to a second position 744 or position 2. The movement 746 of the first electronic device 100 along a linear path is detected, in this example, using one of the motion sensors (e.g. an accelerometer). In this example, movement of the electronic device 100 is only detected as being movement of the first device for the purpose of the blend mode with the second electronic device 300 if the first device 100 is first moved away from surface before the movement and returned to the surface in a new position after the movement. The movement away from the surface may also be detected using a camera or light sensor on the first device 100. That is to say that movement of the first device 100 while it is at or in contact with the surface is not registered for altering/updating the display object displayed on the second electronic device 300. The distance between discrete position 1 and discrete position 2 (and the other discrete positions) is a predetermined distance and is typically 10, 20, 30, 40, 50, 60, 70, 80, 90 or 100 mm. The distance between position 1 and position 2 will typically be the width or other dimension of the first electronic device 100 for ease of reference for the user. The distance moved away from the surface before registering any lateral movement (i.e., movement in the same plane as the surface the device 100 is placed on) is typically greater than 10, 20, 30, 40, 50, 60, 70, 80, 90 or 100 mm.

Once the first device 100 has been moved 746 to the new position 744, the processor 240 of the first device 100 generates and outputs display object data to the second device 300 in response to the detected movement. It is noted that in this example, any movement that is performed that does not result in the first device 100 being moved to one of the discrete positions does not result in a change of the display object data. The output data from the first electronic device 100 is rendered by the processor 240 of the second device 300 and generates a display object 712. The display object 712 is a visual representation of a summary display that could be viewed on the first device 100 and includes, in this example, an indication that one or more email messages have been received, there are one or more diary entries entered for the current day and an instant message has been received. The display icon 712, displayed on the display 204 of the second device 300, moves in from the right hand side of the display 204, as indicated by arrow 714 after the first electronic device 100 is moved to the second position 744.

In FIG. 14C, a user moves 750 the first electronic device 100 a further width of the device 100 from the second position 744. The processor 240 of the first device 100 detects the movement thereof to a third position 748 or position 3. In response to the movement to the third position 748, the processor 240 of the first electronic device 100, generates and outputs data for generating a display icon 718. In this example, if the first electronic device 100 is detected to be moved to position 3, data for generating the display icon 718 is generated by the processor 240 of the first device 100 and is output to the processor 240 of the second device 300 for display. The display icon or object 718 is displayed to move in from the right hand side once the device is moved to the discrete position 748, as is indicated by arrow 716. As above, only if the first electronic device 100 is moved to the third discrete position 748 is data output to the second electronic device 300 to update display object 712 to display object 718.

FIG. 14D illustrates a display object that is generated in response to a user moving 754 the first electronic device 100 a further width of the device 100 to fourth position 752 from the third position 748. The processor 240 of the first device 100 detects the linear movement thereof to a fourth position 752 or position 4. In response to the movement to the fourth discrete position 752, the processor 240 of the first electronic device 100, generates and outputs data for generating a display icon 719. In this example, if the first electronic device 100 is detected to be moved to position 4, data for generating the display icon 719 is generated by the processor 240 of the first device 100 and is output to the processor 240 of the second device 300 for display. As above, only if the first electronic device 100 is moved to the fourth discrete position 752 is data output to the second electronic device 300 to update display object 718 to display object 719. In this example, when it is detected that the user has linearly moved the first device 100 to position 4, the processor 240 of the first device 100 generates and outputs data to the second device 300 to release the display object 718 illustrated in FIG. 14C from the edge of the display 204, as described in association with FIG. 13D.

Each of the positions numbered 1 to 4 are discrete positions that are typically equidistant from one another in this example. The user may select the home position as being a position that can be identified quickly, such that the device 100 can be returned to the home position more easily. Furthermore, the user may arrange markers or positions on the surface for each of the discrete positions to more easily identify their location. The discrete positions are typically arranged along a linear path. Moreover, the detection at the discrete position may be registered if the first device 100 moved to a position that is within a predetermined range of the discrete position e.g., +/−1, 2, 3, 4, 5, 6, 7, 8, 9 and 10 mm.

In an alternative embodiment, it is not necessary to move the device away from the surface before performing the lateral, or linear, movement. That is to say that only movement that is performed while the first electronic device 100 is in contact with the surface is registered as movement for the interaction between the two electronic devices 100, 300.

A user may move the first electronic device 100 to any one of the four discrete positions and the display object will be updated based on data received from the processor 240 of the first electronic device 100 to become one of the display objects illustrated in FIGS. 14A to 14D. More or less discrete poisons may be used, for example, 2, 3, 4, 5, 6, 7, 8, 9, or 10. For example, if the first electronic device 100 is returned or moved to the home position 742, only the display object 700 would be displayed on the display 204 of the second electronic device 300 based on data received from the first electronic device 100. It will be appreciated that the home position 742 may be associated with a null display object. This is to say that a null display object maybe represented by removing all display objects currently displayed on the display 204 of the second electronic device 300 that are associated with applications executable or active on the first electronic device 100 in this example.

FIGS. 15A to 15D illustrate a first electronic device 100 and a second electronic device 300 according to a tenth embodiment. In this example, the first electronic device 100 is a handheld communications device and comprises at least a subset of the components described in association with FIG. 1. The second electronic device 300, in this example, is a desk-top style computer comprising at least a subset of the components described in association with FIG. 1 and including at least a processor 240, memory (e.g., one or more of flash memory 244, random access memory (RAM) 246, read only memory (ROM) 248), a display 204 and an input device (not shown). The two electronic devices 100, 300 are in communication with one another such that any establishment of a connection has already been performed. For example, the two devices may establish a wireless connection using Bluetooth® or a wired connection using USB, as described above. The communication connection is not shown in the figure for ease of illustration.

In this example, the first electronic device 100 generally generates and outputs control data to the second electronic device 300 for display. The second device 300 may be described as a remote device to the extent that it is remote from the first device 100. The outputted data includes control data from an application currently running or active on the processor 240 of the first device 100 that allows the first electronic device to be used as an input or control device (e.g., a mouse, a tack pad, or a track ball) for controlling functions or operations of the second electronic device 300. In this embodiment, the processor 240 of the first electronic device 100 determines the position of the first electronic device 100 at one of four discrete positions, and outputs data to the processor 240 of the second electronic device 300 pertaining to one of the discrete positions depending on the current position of the first electronic device 100. In an alternative embodiment, the processor 240 of the first electronic device 100 outputs data from the orientation subsystem 251 relating to the position/orientation of the first electronic device 100, and the processor 240 of the second electronic device 300 determines the position of the first electronic device 100 according to the discrete positions. The first and second electronic devices 100, 300 will typically have applications for determining the position of the first device 100 and for translating this position data into associated actions.

FIGS. 15A to 15D illustrate the first electronic device 100 being used as a control input device for the second electronic device 300 whereby movement or manipulation of the first device 100 to one or more discrete, or predetermined, positions controls one or more functions on the second electronic device 300 based on control data received from the first electronic device 100. In this example, a gesture or movement of the first device 100 is performed by a user and is detected using one or more motion sensors (e.g., the orientation subsystem 249, which may include a gravity sensor, a gyroscope, a tilt sensor, an electronic compass or other suitable sensor, or combinations thereof) of the first electronic device 100. In this embodiment the first electronic device 100 is placed face up (i.e., the display 204 is face up) on a surface, for example, a desk top surface on which the second electronic device 300 is also placed. In addition to detecting the gesture performed at the first electronic device 100, the processor 240 of the first electronic device may also detect the proximity of the first device 100 to the surface upon which it is placed. The proximity of the first device 100 to a surface may be detected using a backward facing camera (i.e., a camera positioned on a face opposite to the front face of the first device 100) if the first device 100 is placed face up during operation. Alternatively, if the first device 100 is placed faced down during operation, the front facing camera 253 may be used to detect the proximity of the first device 100 to a surface. Other appropriately positioned light or electromagnetic radiation sensors, positioned on the first electronic device 100, could also be used. The proximity of the first device 100 to a surface may be deemed to be at the a surface, i.e., in contact with the surface, or may be deemed to be a predetermined distance from the surface, e.g., 1, 2, 3, 4 or 5 mm away from the surface. In this example, the processor 240 of the first electronic device 100 optionally determines that the first electronic device 100 is in contact with the surface before detecting the position of the first device 100.

The processor determines that the position at which the first electronic device is placed on the surface is the first or home position. The first or home position 760 of the first electronic device 100 is represented by the numeral 1 in the FIG. 15A. When the first electronic device 100 is placed in the home position, which is optionally north or the position at which the first device 100 is placed on a surface prior to the interaction between the two electronic devices 100, 300, the processor 240 of the first electronic device 100 generates and outputs data to the second electronic device 300 to inform the processor 240 of the second electronic device 300 that the first electronic device 100 is in the home position. In response, the processor 240 of the second electronic device 300 generates and outputs display data to its display 204 to update the displayed data to reduce all active applications (i.e., windows or objects associated with active application) on the second electron device 300 to the tool bar or menu bar. This is illustrated in the figure by the three minimise icons 774a, 776a, 778a along the bottom of the display 204 on the tool bar or menu bar 758. Thus the home position 760 of the first electronic device 100 is associated with a display on the second electronic device 300 with all applications minimised. If first electronic device 100 is moved to the home position from any of the other discrete positions discussed below, all applications are minimised.

FIG. 15B illustrates a mode of operation of the first device 100 and the second device 300 using a rotation, which may be referred to as a gesture, performed with the first electronic device 100. In this example, when a user rotates 762 in a clockwise direction the first electronic device 100 90 degrees to a second position 764 or position 2, the processor 240 of the first electronic device 100 generates and outputs data to the second electronic device 300 that informs the processor 240 of the second electronic device 300 that the first electronic device 100 is in position 2 or the second position 764. In response, the processor 240 of the second electronic device 300 generates and outputs display data to its display 204 to update the displayed data to maximise a display object or window associated with the second position 764. The association between applications on the second device 300 and the discrete position of the first device 100 may be performed by a user during set up of the application used to receive and translate the position data received from the first electronic device 100. In this example, the application related to the display object 774a on the tool bar 758 is associated with position 2, such that a display object or window 774b is maximised on the display 204 of the second electronic device 300. In this example, display window 774b relates to an email application.

In FIG. 15C, a user rotates 766 in a clockwise direction the first electronic device 100 90 degrees to a third position 768 or position 3 and the processor 240 of the first electronic device 100 generates and outputs data to the second electronic device 300 that informs the processor 240 of the second electronic device 300 that the first electronic device 100 is in position 3 or the third position 768. In response, the processor 240 of the second electronic device 300 generates and outputs display data to its display 204 to update the displayed data to maximise a display object or window associated with the third position 768. In this example, the application related to the display object 778a on the tool bar 758 is associated with position 3, such that a display object or window 778b is maximised on the display 204 of the second electronic device 300. In this example, display window or object 778b relates to an internet browser application. When the window 778b is maximised any other window (e.g., display window 774b) may be minimised or remain maximised, but behind the display object 778b, i.e., display object 774b is not visible.

In FIG. 15D, a user rotates 770 in a clockwise direction the first electronic device 100 90 degrees to a fourth position 772 or position 4 and the processor 240 of the first electronic device 100 generates and outputs data to the second electronic device 300 that informs the processor 240 of the second electronic device 300 that the first electronic device 100 is in position 4 or the fourth position 772. In response, the processor 240 of the second electronic device 300 generates and outputs display data to its display 204 to update the displayed data to maximise a display object or window associated with the fourth position 772. In this example, the application related to the display object 776a on the tool bar 758 is associated with position 4, such that a display object or window 776b is maximised on the display 204 of the second electronic device 300. In this example, display window or object 776b relates to a messaging application. When the window 776a is maximised any other window (e.g., display windows 774b, 778b) may be minimised or remain maximised, but behind the display object 776b, i.e., display objects 774b, 778b are not visible.

In this embodiment, the applications are assumed to be already active on the processor 240 of the second electronic device 300. However, in an alternative embodiment, moving the first electronic device to one of the discrete positions may cause the associated application to be launched, if it is not already active or running. Furthermore, rather than minimising the applications as the first device 100 is moved to a different or new position, e.g., from position 2 to position 3, the application associated with the previous position (i.e., position 2) may be closed.

Figure 16A:
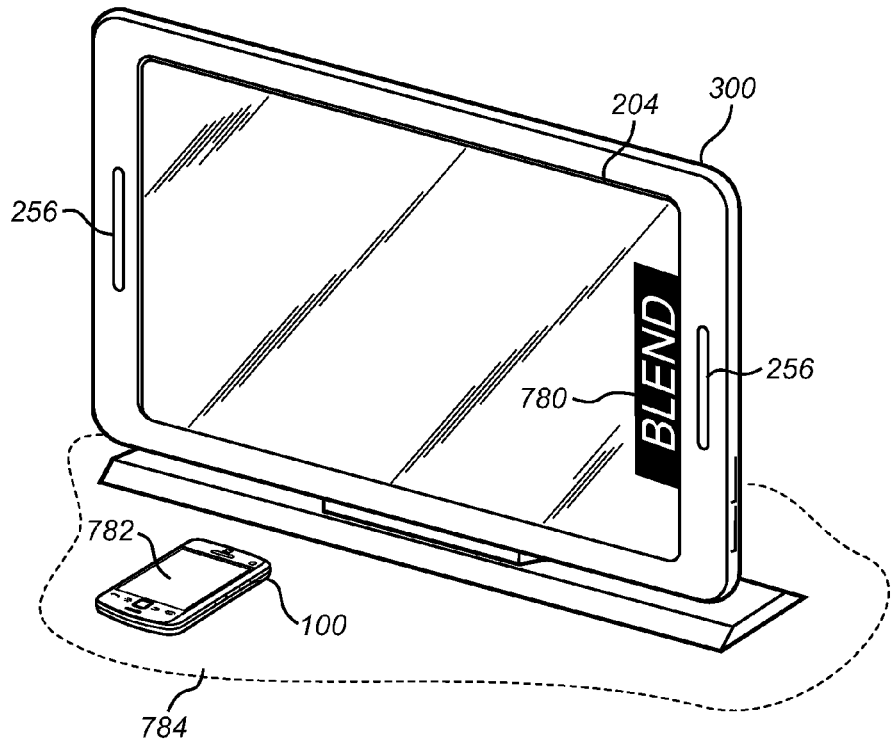
FIGS. 16A and 16B illustrate a system comprising the two devices illustrated in FIGS. 2 and 3 in communication with one another showing how the two devices interact with one another in an eleventh embodiment.
Figure 16B:
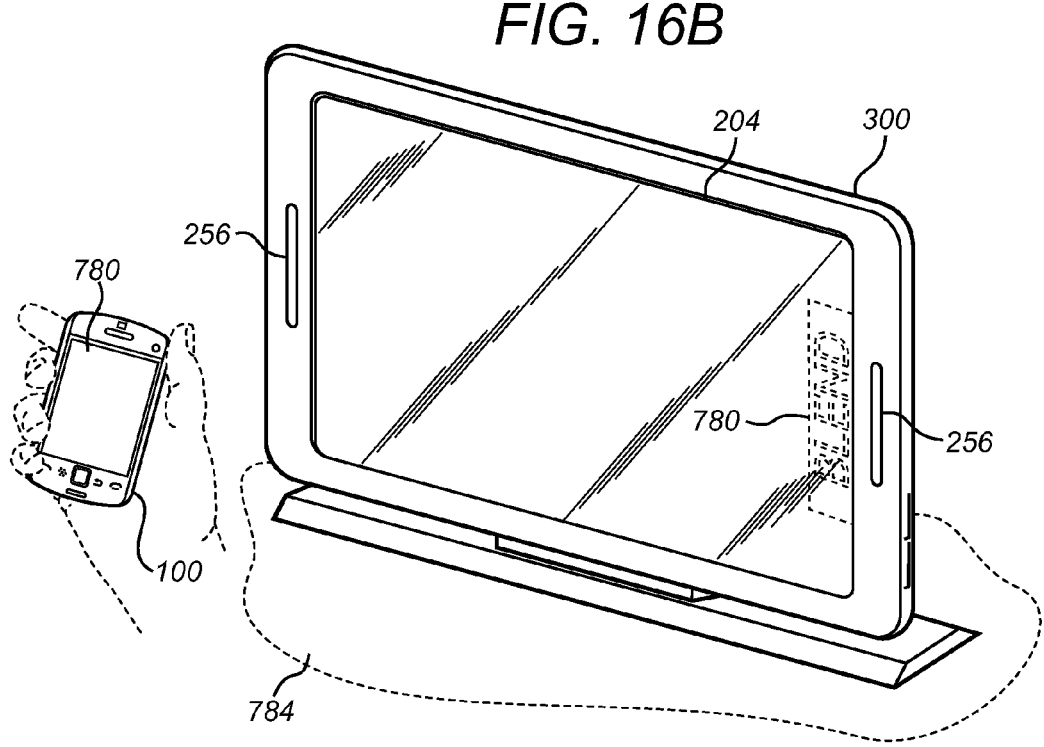

FIGS. 16A and 16B illustrate a first electronic device 100 and a second electronic device 300 according to an eleventh embodiment. In this example, the first electronic device 100 is a handheld communications device and comprises at least a subset of the components described in association with FIG. 1. The second electronic device 300, in this example, is a desk-top style computer comprising at least a subset of the components described in association with FIG. 1 and including at least a processor 240, memory (e.g., one or more of flash memory 244, random access memory (RAM) 246, read only memory (ROM) 248), a display 204 and an input device (not shown). The two electronic devices 100, 300 are in communication with one another such that any establishment of a connection has already been performed. For example, the two devices may establish a wireless connection using Bluetooth® or a wired connection using USB, as described above. The communication connection is not shown in the figure for ease of illustration. Moreover, the first and second electronic devices 100, 300 correspond to those describe in association with FIGS. 5A to 15D which may optionally be configured to perform the operations described in association with FIGS. 16A and 16B.

In this example, the first electronic device 100 generally generates and outputs data to the second electronic device 300 for display. The second device 300 may be described as a remote device to the extent that it is remote from the first device 100. The outputted data may include any data from an application currently running or active on the processor 240 of the first device 100, and may be, for example, data relating to received messages, diary alerts, reminders, received data, data feeds, or status updates. The transfer of data between the first device 100 and the second device 300 is performed in examples described herein using the Blackberry Bridge. However, other protocols that allow messages, feeds, notifications and similar to be pushed to or transferred to the second device 300 from the first device 100, for example Link. Furthermore, in the examples described herein the first device 100 and the second device 300 have installed thereon an executable application to allow the first device 100 to push data to the second device 300.

FIG. 16A illustrates the first electronic device 100 and the second electronic device 300 being used in a blending mode whereby movement or manipulation of the first device 100 causes an interaction typically with one or more display objects displayed on the second electronic device 300. A gesture or movement of the first device 100 is performed by a user and is detected using one or more motion sensors (e.g., the orientation subsystem 249, which may include a gravity sensor, a gyroscope, a tilt sensor, an electronic compass or other suitable sensor, or combinations thereof) of the first electronic device 100. The first electronic device 100 is placed face up 782 (i.e., the display 204 is face up) on a surface 784, for example, a desk top surface on which the second electronic device 300 is also placed. The processor 240 of the first electronic device detects the proximity of the first device 100 to the surface upon which it is placed. The proximity of the first device 100 to a surface may be detected using a backward facing camera (i.e., a camera positioned on a face opposite to the front face of the first device 100) if the first device 100 is placed face up during operation. Alternatively, if the first device 100 is placed faced down during operation, the front facing camera 253 may be used to detect the proximity of the first device 100 to a surface. Other appropriately positioned light or electromagnetic radiation sensors, positioned on the first electronic device 100, could also be used. The proximity of the first device 100 to a surface may be deemed to be at a surface, i.e., in contact with the surface, or may be deemed to be a predetermined distance from the surface, e.g., 1, 2, 3, 4 or 5 mm away from the surface.

In this example, the processor 240 of the first electronic device 100 optionally determines that the first electronic device 100 is in contact with the surface before detecting the position of the first device 100. The orientation of the first electronic device 100 may also be detected using the orientation subsystem 251 to determine if the first device is level, which may be used to infer that the first device is place on a surface, since surfaces are typically level. It will be understood that the device may not need to be detected as being absolutely level. Rather, the first device 100 could be detected as being level if it is within 1, 2, 3, 4, or 5 degrees of level along an axis of the horizontal plane. Once the first device 100 is detected as being on the surface 784, the processor 240 of the first electronic device 100 to be operated in the blend mode described above in association with FIGS. 5A to 14D and/or the control mode as described above in association with FIGS. 15A to 15D. In FIG. 16A, the display object 780 displayed on the display 204 of the second electronic device 300 is used to illustrate that the two electronic devices 100, 300 are operating according to the blend mode.

The processor 240 of the first electronic device 100 may be configured to launch an application on the first electronic device 100 to allow the first electronic device 100 to be operated in the blend mode or a control mode when it is detected that the first device 100 is placed on the surface 784. Alternatively, the application may already be active on the processor 240 of the first electronic device 100 to allow the first electronic device 100 to be operated in the blend mode or a control mode, such that when the first device 100 is placed or replaced on the surface 784, the movement of the first electronic device 100 is used to interact with the second electronic device 300 in the blend or control mode, as discussed above. In this example, the distance between the first and second devices 100, 300 may also be used to determine if the two devices should interact. For example, the distance between the first and second electronic devices 100, 300 may be detected using the signal strength of one or more of the wireless connectivity systems present on the two devices. For example, when the first electronic device 100 is placed on the surface 784, the processor 240 of the first device also determines if the distance between the two electronic devices 100, 300 is less than a predetermined distance (e.g., 0.25, 0.5, 0.75, 1, 1.25, 1.5, 1.75 or 2 metres, and distances there between) before commencing the interaction.

In FIG. 16B the first electronic device 100 is illustrated as being moved away from the surface 784. When the processor 240 of the first electronic device 100 detects that the first electronic device 100 is no longer on or at the surface 784, the processor is caused to exit the blend or control mode. This is illustrated in the figure by the now dashed display object 780. The movement of the electronic device 100 from the surface 784 is detected in the same manner as detecting the proximity of the first electronic device 100 with the surface 784. When the processor 240 exits the blend or control mode, it may close any applications that are currently active on the first electronic device 100 that allow the interaction between the two electronic devices 100, 300 to be performed. Alternatively, any applications that are currently active on the first electronic device 100 to allow the interaction between the two electronic devices 100, 300 may cease the transmission of data (e.g., control or display data) between the two electronic devices 100, 300, while keeping the applications running or active. If the first electronic device 100 is returned to the surface 784, the blend or control modes may be reinstated by either executing the appropriate application on the processor 240 of the first electronic device 100 or by transmission of the appropriate data between the two electronic devices 100, 300.

The camera 253 may also be used for detecting the linear or rotational movement of the first electronic device 100.

FIG. 17 is a flow chart depicting a method 800 performed by the processor 240 of a first electronic device 100 or a second electronic device 300. It will be appreciated that some of the steps are optional and may be performed in a different order than that described and may also be performed on multiple electronic devices.

At block 802, detecting an electronic device being positioned at one of a plurality of discrete positions.

At block 804, generating data pertaining to at least one application associated with the one detected discrete position for generating or modifying a display object on a display generated by a remote device.

Any of the alternative modes of operation discussed in association with each of FIGS. 13A to 17 may equally be applied to each of the described embodiments.

While the present application is primarily described in terms of device and methods (e.g., first and second devices 100, 300), the devices may include components for performing at least some of the example aspects and features of the described methods, be it by way of hardware components (such as the memory 244, 246, 248 and/or the processor 240), software or any combination of the two, or in any other manner. Moreover, an article of manufacture for use with the apparatus, such as a pre-recorded storage device or other similar computer readable medium including program instructions recorded thereon may direct the apparatus to facilitate the practice of the described methods. It should be understood that such apparatus and articles of manufacture come within the scope of the present application.

The term "computer readable medium" as used herein means any non-transitory medium which can store instructions for use by or execution by a computer or other computing device or processing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

It will be appreciated that the foregoing discussion relates to particular embodiments. However, in other embodiments, various aspects and examples may be combined. In particular, aspects and modes of operation discussed in association with FIGS. 5A to 12 can be combined with aspects and modes of operation discussed in association with FIGS. 13A to 17.

This disclosure includes the following numbered embodiments:

Embodiment 1. A device comprising:
a processor configured to communicate with a remote device, the processor being further configured to:
output data, to the remote device, for controlling a display object on a portion of a display generated by the remote device,
wherein the display object is controlled in response to a detected gesture performed at the device, and
wherein the data pertains to an application executable on the device.

Embodiment 2. The device of embodiment 1, wherein the processor is configured to generate first data and, in response to the detected gesture, to generate second data.

Embodiment 3. The device of embodiment 2, wherein the second data comprises at least the first data.

Embodiment 4. The device of embodiment 2 wherein the first data pertains to data for a display object and the second data pertains to data for an expansion of the display object on the display.

Embodiment 5. The device of embodiment 2, wherein the first data pertains to data for generating the display object on the display and the second data pertains to data for a removal of the display object from the display.

Embodiment 6. The device of embodiment 1, wherein the gesture is a continuous movement and the processor is configured to continuously output updated data in response to the continuous gesture.

Embodiment 7. The device of embodiment 1, wherein the display object pertains to one or more of a received message, diary alert, reminder, received data, data feeds, or a status update.

Embodiment 8. The device of embodiment 1, wherein the device comprises an input device configured to detect the gesture.

Embodiment 9. The device of embodiment 7, wherein the input device comprises one or more of a camera, a motion sensor, an accelerometer, a gyroscope, a touch sensor, proximity sensor or a push switch.

Embodiment 10. The device of embodiment 1, wherein the detected gesture comprises one or more of a motion adjacent to the device, a movement of the device, or contact with a surface of the device.

Embodiment 11. The device of embodiment 9, wherein the movement of the device comprises one or more of a tilt, a lateral movement, or a rotational movement.

Embodiment 12. The device of embodiment 1, wherein the processor is configured to detect a tilt angle of the device and generate the data based on the detected tilt angle.

Embodiment 13. he device of embodiment 1, wherein the processor is configured to determine if a user is interacting with the device and to generate and output data for generating a display on the device if it is determined that the user is interacting with the device.

Embodiment 14. The device of embodiment 1, wherein the processor is configured to establish a connection with the remote device when the device is within a predetermined proximity of the remote device.

Embodiment 15. The device of embodiment 1, wherein the processor is configured to establish a connection with the remote device in response to detecting a near field communication tag associated with the remote device.

Embodiment 16. The device of embodiment 1, wherein the display object comprises a displayable component that, when displayed, occupies only a sub-portion of the display of the remote device.

Embodiment 17. The device of embodiment 1, wherein the data comprises display data to be rendered by a processor of the remote device for display.

Embodiment 18. The device of embodiment 1, wherein the data comprises application data for generating display data to be rendered by a processor of the remote device for display.

Embodiment 19. The device of embodiment 1, wherein the data pertains to a drop target associated with transferring data to the processor from the remote device.

Embodiment 20. The device embodiment 1, wherein the processor is configured to generate and output, to the remote device, first data for use in generating a display in response to a first detected gesture, and to generate and output, to the remote device, second data for use in updating the display in response to a second gesture or after a predetermined time has lapsed.

Embodiment 21. The device embodiment 1, wherein the application is an active application.

Embodiment 22. The device of embodiment 1, wherein the processor is configured to transfer control of the displayed display object to the remote device in response to a detected gesture.

Embodiment 23. The device of embodiment 1, wherein the display is a pre-existing display of the remote device, and the display object data is generated so as to be combined with the pre-existing display.

Embodiment 24. A system comprising:
a device according to embodiment 1 and a remote device; the remote device comprising:
a processor configured to communicate with the device and to receive the data for controlling a display object on a portion of a display from the device and to generate a display based on the received data.

Embodiment 25. The system of embodiment 24, wherein the processor of the remote device is configured to determine the location of the device with respect to a display of the device and to generate the display object data based on the device location with respect to the display of the device.

Embodiment 26. The system of embodiment 24, wherein the processor of the remote device is configured to determine if the data received from the processor of the device is unique and to generate a display based on the unique data.

Embodiment 27. The system of embodiment 24, wherein the processor of the remote device is configured to determine if a user is interacting with the remote device and to generate display object data based on the data received from the processor of the device if it is determined that the user is interacting with the remote device.

Embodiment 28. The system of embodiment 24, comprising a near field communication tag.

Embodiment 29. The system of embodiment 24, comprising a surface arranged to receive the device.

Embodiment 30. The system embodiment 24, comprising one or more input devices configured to detect the gesture associated with the device.

Embodiment 31. A method for use in a device comprising the steps of:
detecting a gesture at the device; and
outputting data, to a remote device, for controlling a display object on a portion of a display generated by the remote device,
wherein the display object is controlled in response to the detected gesture performed at the device, and
wherein the data pertains to an application executable on the device.

Embodiment 32. The method of embodiment 31, comprising the step of generating first data and, in response to the detected gesture, generating second data.

Embodiment 33. The method of embodiment 32, wherein the second data comprises at least the first data.

Embodiment 34. The method of embodiment 32, wherein the first data pertains to data for a display object and the second data pertains to data for an expansion of the display object on the display.

Embodiment 35. The method of embodiment 32, wherein the first data pertains to data for generating the display object on the display and the second data pertains to data for a removal of the display object from the display.

Embodiment 36. The method of embodiment 31, wherein the gesture is a continuous movement and the method comprises the step of continuously outputting updated data in response to the continuous gesture.

Embodiment 37. The method of embodiment 31, wherein the display object pertains to one or more of a received message, diary alert, reminder, received data, data feeds, or a status update.

Embodiment 38. The method of embodiment 31, comprising the step of detecting a gesture.

Embodiment 39. The method of embodiment 31, wherein the detected gesture comprises one or more of a motion adjacent to the device, a movement of the device, or contact with a surface of the device.

Embodiment 40. The method of embodiment 39, wherein the movement of the device comprises one or more of a tilt, a lateral movement, or a rotational movement.

Embodiment 41. The method of embodiment 31, comprising the step of detecting a tilt angle of the device and generate the data based on the detected tilt angle.

Embodiment 42. The method of embodiment 31, comprising the steps of determining if a user is interacting with the device and generating and outputting data for generating a display on the device if it is determined that the user is interacting with the device.

Embodiment 43. The method of embodiment 31, comprising the step of establishing a connection with the remote device when the device is within a predetermined proximity of the remote device.

Embodiment 44. The method of embodiment 31 comprising the step of establishing a connection with the remote device in response to detecting a near field communication tag associated with the remote device.

Embodiment 45. The method of embodiment 31, wherein the display object comprises a displayable component that, when displayed, occupies only a sub-portion of the display of the remote device.

Embodiment 46. The method of embodiment 31, wherein the data comprises display data to be rendered by a processor of the remote device for display.

Embodiment 47. The method of embodiment 31, wherein the data comprises application data for generating display data to be rendered by a processor of the remote device for display.

Embodiment 48. The method of embodiments 31, wherein the data pertains to a drop target associated with transferring data to the processor from the remote device.

Embodiment 49. The method of embodiment 31, comprising the steps of generating and outputting, to the remote device, first data for use in generating a display in response to a first detected gesture, and generating and outputting, to the remote device, second data for use in updating the display in response to a second gesture or after a predetermined time has lapsed.

Embodiment 50. The method of embodiment 31, wherein the application is an active application.

Embodiment 51. The method of embodiment 31, comprising the step of transferring control of the displayed display object to the remote device in response to a detected gesture.

Embodiment 52. The method of embodiment 31, wherein the display is a pre-existing display of the remote device, and the display object data is generated so as to be combined with the pre-existing display.

Embodiment 53. A method for a system comprising a method according to embodiment 31; the method further comprising the steps of receiving the data for handling the display object from the device and generating a display based on the received data.

Embodiment 54. The method of embodiment 53, comprising the step of determining the location of the device with respect to a display of the device and generating the display object data based on the device location with respect to the display of the device.

Embodiment 55. The method of embodiment 53, comprising the step of determining if the data received from the processor of the device is unique and generating a display based on the unique data.

Embodiment 56. The method of embodiment 53, comprising the steps of determining if a user is interacting with the remote device and generating display object data based on the data received from the processor of the device if it is determined that the user is interacting with the remote device.

Embodiment 57. A computer-readable medium comprising executable instructions which, when executed, cause a processor to perform the method of:
detecting a gesture at a device; and
outputting data, to a remote device, for controlling a display object on a portion of a display generated by the remote device, wherein the display object is controlled in response to the detected gesture performed at the device, and wherein the data pertains to an application executable on the device.

Embodiment 58. A device comprising a processing circuit configured to perform a method of:

detecting a gesture at a device; and outputting data, to a remote device, for controlling a display object on a portion of a display generated by the remote device, wherein the display object is controlled in response to the detected gesture performed at the device, and wherein the data pertains to an application executable on the device.

Embodiment 59. A device comprising:

a processor configured to communicate with a remote device, the processor being further configured to:

receive data from the remote device for controlling a display object on a portion of a display generated by the device, wherein the display object is controlled in response to a detected gesture performed at the remote device, and wherein the data pertains to an application executable on the remote device.

Embodiment 60. A method comprising the steps of:

detecting an electronic device being positioned at one of a plurality of discrete positions; and generating data pertaining to at least one application associated with the one detected discrete position for generating or modifying a display object on a display generated by a remote device.

Embodiment 61. The method of embodiment 60, wherein the discrete positions are separated along a linear path of movement of the electronic device.

Embodiment 62. The method of embodiment 60, wherein the discrete positions are separated radially along a rotational path of movement of the electronic device.

Embodiment 63. The method of any one of embodiments 60 to 62, comprising the steps of detecting the proximity of the electronic device to a surface and only registering movement that is performed while the electronic device is at the surface.

Embodiment 64. The method of any one of embodiments 60 to 62, comprising the steps of detecting the proximity of the electronic device to a surface and only registering movement that is performed when the electronic device is not at the surface.

Embodiment 65. The method of embodiment 63 or embodiment 64, comprising the step of only registering the movement if the electronic device is at the surface before and after the movement is performed.

Embodiment 66. The method of any one of embodiments 60 to 65, comprising the step of only registering the detected position of the electronic device when the electronic device is at the one of the plurality of discrete positions.

Embodiment 67. The method of any one of embodiments 60 to 66, wherein each of the discrete positions is associated with at least one of a plurality of applications executable on the electronic device.

Embodiment 68. The method of embodiment 67, wherein at least one of the discrete positions is associated with executing at least one of the plurality of applications executable on the electronic device, wherein the method comprises, in response to detecting the electronic device at the one discrete position, executing the at least one application and outputting, to the remote device, data pertaining to the executed application for generating a display object.

Embodiment 69. The method of any one of embodiments 60 to 67, wherein each of the discrete positions is associated with at least one of a plurality of applications currently active on the electronic device, wherein the method comprises:

outputting, to the remote device, data pertaining to the executed application for generating a display object; and outputting data, in response to detecting the electronic device at the one discrete position, to update the display object associated with the executed application.

Embodiment 70. The method of any embodiment 68 or embodiment 69, wherein at least one of the other discrete positions is associated with outputting data to update the display object associated with the executed application.

Embodiment 71. The method of any one of embodiments 68 to 70, comprising the steps of detecting the electronic device at one of the other discrete positions and closing the at least one application in response to detecting the electronic device at the one of the other discrete positions.

Embodiment 72. The method of any one of embodiments 60 to 71, wherein at least one of the discrete positions is associated with outputting data to the remote device for generating a null display object or removing a displayed display object.

Embodiment 73. A method comprising the steps of:

receiving, at a remote device, data pertaining to a detected position of an electronic device generated according to any one of embodiments 67 to 72; and generating or modifying, at the remote device, a display object based on the received data.

Embodiment 74. A method comprising the steps of:

receiving, at a remote device, position data of an electronic device, and performing the method according to any one of embodiments 60 to 66.

Embodiment 75. The method according to embodiment 74, wherein each of the discrete positions is associated with at least one of a plurality of applications executable on the remote device.

Embodiment 76. The method of embodiment 75, wherein at least one of the discrete positions is associated with executing at least one of the plurality of applications executable on the electronic device, wherein the method comprises, in response to detecting the electronic device at the one discrete position, executing the at least one application and outputting data pertaining to the executed application for generating a display object on the remote device.

Embodiment 77. The method of embodiment 75, wherein each of the discrete positions is associated with at least one of a plurality of applications currently active on the remote device, wherein the method comprises:

outputting data pertaining to the executed application for generating a display object; and outputting data, in response to detecting the electronic device at the one discrete position, to update the display object associated with the executed application.

Embodiment 78. The method of embodiment 76 or embodiment 77, wherein at least one of the other discrete positions is associated with generating data to update the display object associated with the executed application.

Embodiment 79. The method of any one of embodiments 75 to 78, comprising the steps of detecting the electronic device at one of the other discrete positions and closing the at least one application in response to detecting the electronic device at the one of the other discrete positions.

Embodiment 80. The method of any one of embodiments 74 to 79, wherein at least one of the discrete positions is associated with outputting data associated for generating a null display object.

Embodiment 81. An electronic device, comprising processing circuitry configured to perform the method of any one of embodiments 60 to 80.

Embodiment 82. An electronic device, comprising processing circuitry configured to perform a method comprising the steps of:
detecting an electronic device being positioned at one of a plurality of discrete positions; and
generating data pertaining to at least one application associated with the one detected discrete position for generating or modifying a display object on a display generated by a remote device.

Embodiment 83. A computer-readable medium comprising executable instructions which, when executed, cause a processor to perform a method according to any one of embodiments 60 to 80.

Embodiment 84. A computer-readable medium comprising executable instructions which, when executed, cause a processor to perform a method comprising the steps of:
detecting an electronic device being positioned at one of a plurality of discrete positions; and
generating data pertaining to at least one application associated with the one detected discrete position for generating or modifying a display object on a display generated by a remote device.

Embodiment 85. The computer-readable medium of embodiment 84, wherein the discrete positions are separated along a linear path of movement of the electronic device.

Embodiment 86. The computer-readable medium of embodiment 84, wherein the discrete positions are separated radially along a rotational path of movement of the electronic device.

Embodiment 87. The computer-readable medium of any one of embodiments 84 to 86, the method comprising the steps of detecting the proximity of the electronic device to a surface and only registering movement that is performed while the electronic device is at the surface.

Embodiment 88. The computer-readable medium of any one of embodiments 84 to 86, the method comprising the steps of detecting the proximity of the electronic device to a surface and only registering movement that is performed when the electronic device is not at the surface.

Embodiment 89. The computer-readable medium of embodiment 87 or embodiment 88, the method comprising the step of only registering the movement if the electronic device is at the surface before and after the movement is performed.

Embodiment 90. The computer-readable medium of any one of embodiments 84 to 89, the method comprising the step of only registering the detected position of the electronic device when the electronic device is at the one of the plurality of discrete positions.

Embodiment 91. The computer-readable medium of any one of embodiments 84 to 90, wherein each of the discrete positions is associated with at least one of a plurality of applications executable on the electronic device.

Embodiment 92. The computer-readable medium of embodiment 91, wherein at least one of the discrete positions is associated with executing at least one of the plurality of applications executable on the electronic device, wherein the method comprises, in response to detecting the electronic device at the one discrete position, executing the at least one application and outputting, to the remote device, data pertaining to the executed application for generating a display object.

Embodiment 93. The computer-readable medium of any one of embodiments 84 to 90, wherein each of the discrete positions is associated with at least one of a plurality of applications currently active on the electronic device, wherein the method comprises:
outputting, to the remote device, data pertaining to the executed application for generating a display object; and
outputting data, in response to detecting the electronic device at the one discrete position, to update the display object associated with the executed application.

Embodiment 94. The computer-readable medium of embodiment 92 or embodiment 93, wherein at least one of the other discrete positions is associated with outputting data to update the display object associated with the executed application.

Embodiment 95. The computer-readable medium of any one of embodiments 92 to 94, the method comprising the steps of detecting the electronic device at one of the other discrete positions and closing the at least one application in response to detecting the electronic device at the one of the other discrete positions.

Embodiment 96. The computer-readable medium of any one of embodiments 84 to 95, wherein at least one of the discrete positions is associated with outputting data to the remote device for generating a null display object or removing a displayed display object.

Embodiment 97. A computer-readable medium comprising executable instructions which, when executed, cause a processor to perform a method comprising the steps of:
receiving, at a remote device, data pertaining to a detected position of an electronic device generated according to any one of embodiments 91 to 96; and
generating or modifying, at the remote device, a display object based on the received data.

Embodiment 98. A computer-readable medium comprising executable instructions which, when executed, cause a processor to perform a method comprising the steps of:
receiving, at a remote device, position data of an electronic device, and performing the method according to any one of embodiments 84 to 90.

Embodiment 99. The computer-readable medium according to embodiment 98, wherein each of the discrete positions is associated with at least one of a plurality of applications executable on the remote device.

Embodiment 100. The computer-readable medium of embodiment 99, wherein at least one of the discrete positions is associated with executing at least one of the plurality of applications executable on the electronic device, wherein the method comprises, in response to detecting the electronic device at the one discrete position, executing the at least one application and outputting data pertaining to the executed application for generating a display object on the remote device.

Embodiment 101. The computer-readable medium of embodiment 99, wherein each of the discrete positions is associated with at least one of a plurality of applications currently active on the remote device, wherein the method comprises:
outputting data pertaining to the executed application for generating a display object; and
outputting data, in response to detecting the electronic device at the one discrete position, to update the display object associated with the executed application.

Embodiment 102. The computer-readable medium of embodiment 100 or embodiment 101, wherein at least one of the other discrete positions is associated with generating data to update the display object associated with the executed application.

Embodiment 103. The computer-readable medium of any one of embodiments 98 to 102, the method comprising the steps of detecting the electronic device at one of the other discrete positions and closing the at least one application in response to detecting the electronic device at the one of the other discrete positions.

Embodiment 104. The computer-readable medium of any one of embodiments 98 to 103, wherein at least one of the discrete positions is associated with outputting data associated for generating a null display object.

Embodiment 105. A method comprising the steps of:
detecting the proximity of an electronic device to a surface;
generating, in response to detecting the electronic device at the surface, data pertaining to control of at least one of a plurality of executable applications associated with a remote device.

Embodiment 106. The method of embodiment 105, wherein the plurality of applications are executable on the remote device, and the method comprises outputting the data to the remote device to control the at least one of the plurality of applications executable on the remote device.

Embodiment 107. The method of embodiment 105 wherein the plurality of applications are executable on the electronic device, and the method comprises outputting the data to the at least one of the plurality of applications executable on the electronic device.

Embodiment 108. The method of embodiment 107, comprising the step of outputting, in response to detecting the electronic device at the surface, data pertaining to the at least one of the plurality of applications executable on the electronic device, to the remote device, for generating a display object on a portion of a display generated by the remote device.

Embodiment 109. A computer-readable medium comprising executable instructions which, when executed, cause a processor to perform a method according to any one of embodiments 105 to 108.

Embodiment 110. A device comprising a processing circuit configured to perform the method according to any one of embodiments 105 to 108.

The invention claimed is:

1. A method comprising:
detecting that an electronic device has been positioned in contact with a surface at a first position and in a given orientation;
in response to the detecting, monitoring for a plurality of discrete positions at which the electronic device is able to be transitioned to while in contact with the surface, where the plurality of discrete positions are not monitored for when the electronic device is not in the given orientation and in contact with the surface;
in response to the monitoring, registering the electronic device being transitioned to one of the plurality of discrete positions, wherein the transition of the electronic device to one of the plurality of discrete positions is only registered when the transition occurs while the electronic device is in the given orientation and in contact with the surface; and
while the electronic device is being maintained at the one of the plurality of discrete positions after the transition has been registered,
generating data pertaining to at least one application associated with the one detected discrete position for controlling at least one display object generated by a remote device and presented on the remote device, wherein different sets of data are generated for each of the plurality of discrete positions, and wherein each different set of data controls the display object in a different manner.

2. The method of claim 1, wherein the discrete positions are separated along a linear path of movement of the electronic device, or the discrete positions are separated radially along a rotational path of movement of the electronic device.

3. The method of claim 1, wherein the movement is only registered if the electronic device is at the surface before and after the movement is performed.

4. The method of claim 1, further comprising:
only registering the detected position of the electronic device when the electronic device is at the one of the plurality of discrete positions.

5. The method of claim 1, wherein each of the discrete positions is associated with at least one of a plurality of applications executable on the electronic device.

6. The method of claim 5, wherein at least one of the discrete positions is associated with executing at least one of the plurality of applications executable on the electronic device,
wherein the method comprises, in response to detecting the electronic device at the one discrete position, executing the at least one application and outputting, to the remote device, data pertaining to the executed application for generating a display object.

7. A method comprising:
receiving, at a remote device, data pertaining to a detected position of an electronic device generated according to claim 5; and
generating or modifying, at the remote device, a display object based on the received data.

8. The method of claim 1, wherein each of the discrete positions is associated with at least one of a plurality of applications currently active on the electronic device, wherein the method comprises:
outputting, to the remote device, data pertaining to the executed application for generating a display object; and
outputting data, in response to detecting the electronic device at the one discrete position, to update the display object associated with the executed application.

9. The method of claim 1, wherein at least one of the discrete positions is associated with outputting data to the remote device for generating a null display object or removing a displayed display object.

10. A method comprising:
receiving, at a remote device, position data of an electronic device, and performing the method according to claim 1.

11. The method of claim 10, wherein each of the discrete positions is associated with at least one of a plurality of applications executable on the remote device.

12. The method of claim 11, wherein at least one of the discrete positions is associated with executing at least one of the plurality of applications executable on the electronic device,
wherein the method comprises, in response to detecting the electronic device at the one discrete position, executing the at least one application and outputting data pertaining to the executed application for generating a display object on the remote device.

13. The method of claim 11, wherein each of the discrete positions is associated with at least one of a plurality of applications currently active on the remote device, wherein the method comprises:
outputting data pertaining to the executed application for generating a display object; and
outputting data, in response to detecting the electronic device at the one discrete position, to update the display object associated with the executed application.

14. An electronic device, comprising processing circuitry configured to perform a method comprising:
detecting that an electronic device has been positioned in contact with a surface at a first position and in a given orientation;
in response to the detecting, monitoring for a plurality of discrete positions at which the electronic device is able to be transitioned to while in contact with the surface, where the plurality of discrete positions are not monitored for when the electronic device is not in the given orientation and in contact with the surface;
in response to the monitoring, registering the electronic device being transitioned to one of the plurality of discrete positions, wherein the transition of the electronic device to one of the plurality of discrete positions is only registered when the transition occurs while the electronic device is in the given orientation and in contact with the surface; and
while the electronic device is being maintained at the one of the plurality of discrete positions after the transition has been registered,
generating data pertaining to at least one application associated with the one detected discrete position for controlling at least one display object generated by a remote device and presented on the remote device, wherein different sets of data are generated for each of the plurality of discrete positions, and wherein each different set of data controls the display object in a different manner.

15. A non-transitory computer-readable medium comprising executable instructions which, when executed, cause a processor to perform a method comprising:
detecting that an electronic device has been positioned in contact with a surface at a first position and in a given orientation;
in response to the detecting, monitoring for a plurality of discrete positions at which the electronic device is able to be transitioned to while in contact with the surface, where the plurality of discrete positions are not monitored for when the electronic device is not in the given orientation and in contact with the surface;
in response to the monitoring, registering the electronic device being transitioned to one of the plurality of discrete positions, wherein the transition of the electronic device to one of the plurality of discrete positions is only registered when the transition occurs while the electronic device is in the given orientation and in contact with the surface; and
while the electronic device is being maintained at the one of the plurality of discrete positions after the transition has been registered,
generating data pertaining to at least one application associated with the one detected discrete position for controlling at least one display object generated by a remote device and presented on the remote device, wherein different sets of data are generated for each of the plurality of discrete positions, and wherein each different set of data controls the display object in a different manner.

16. The non-transitory computer-readable medium of claim 15, wherein the discrete positions are separated along a linear path of movement of the electronic device or the discrete positions are separated radially along a rotational path of movement of the electronic device.

17. The non-transitory computer-readable medium of claim 15, wherein each of the discrete positions is associated with at least one of a plurality of applications executable on the electronic device.

18. The non-transitory computer-readable medium of claim 17, wherein at least one of the discrete positions is associated with executing at least one of the plurality of applications executable on the electronic device,
wherein the method comprises, in response to detecting the electronic device at the one discrete position, executing the at least one application and outputting, to the remote device, data pertaining to the executed application for generating a display object.

* * * * *